United States Patent [19]

Perlmutter

[11] Patent Number: 4,701,006

[45] Date of Patent: Oct. 20, 1987

[54] OPTICAL-DIGITAL HOLOGRAM RECORDING

[75] Inventor: Robert J. Perlmutter, Palo Alto, Calif.

[73] Assignee: Stanford University, Stanford, Calif.

[21] Appl. No.: 703,521

[22] Filed: Feb. 20, 1985

[51] Int. Cl.$^4$ ............................................. G03H 1/08
[52] U.S. Cl. ..................................... 350/3.66; 350/3.6
[58] Field of Search ....................... 350/3.66, 3.6, 3.67

[56] References Cited

U.S. PATENT DOCUMENTS 4,498,740  2/1985  Caulfield ............................ 350/3.66

OTHER PUBLICATIONS

Perlmutter, R. J. et al. "Computer-Generated Holograms in Biology and Medicine", IEEE Computer Graphics and Applications, Aug. 1983, pp. 47-51.

Primary Examiner—Bruce Y. Arnold
Attorney, Agent, or Firm—Flehr, Hohbach, Test, Albritton & Herbert

[57] ABSTRACT

A hologram is formed of an object by calculating a two dimensional complex field distribution for a diffraction pattern of the object, and then modulating a first coherent light beam with amplitude and phase values of the two-dimensional complex field distribution as the first coherent light beam is scanned across a recording medium. A second reference coherent light beam is scanned across the recording medium and intersects the first modulated coherent light beam in the recording medium as the two beams are scanned. A reflection hologram is synthesized in the recording medium by directing the two beams from opposite sides of the film recording medium.

8 Claims, 11 Drawing Figures

FIG.—1

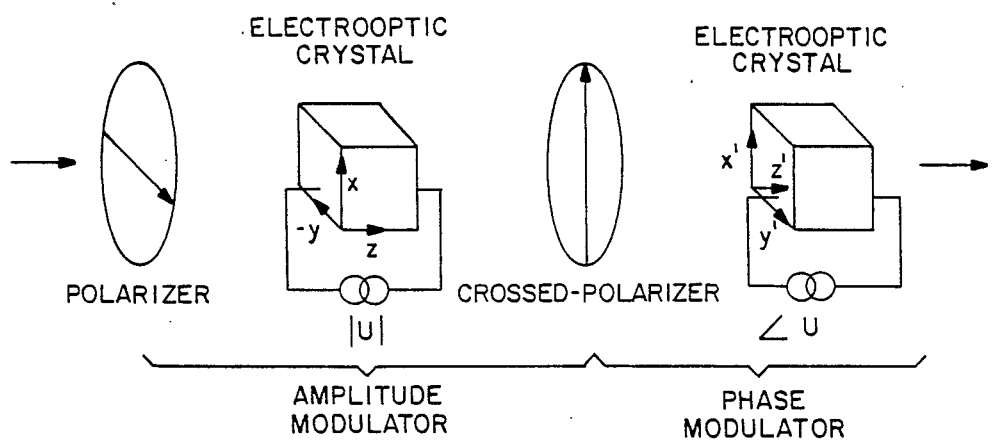
FIG.—5
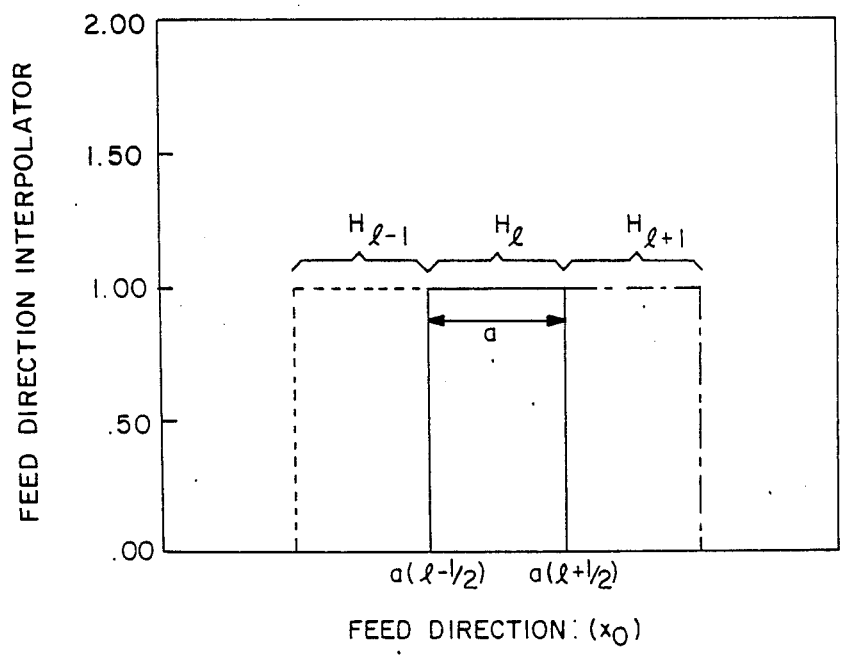
FIG.—7

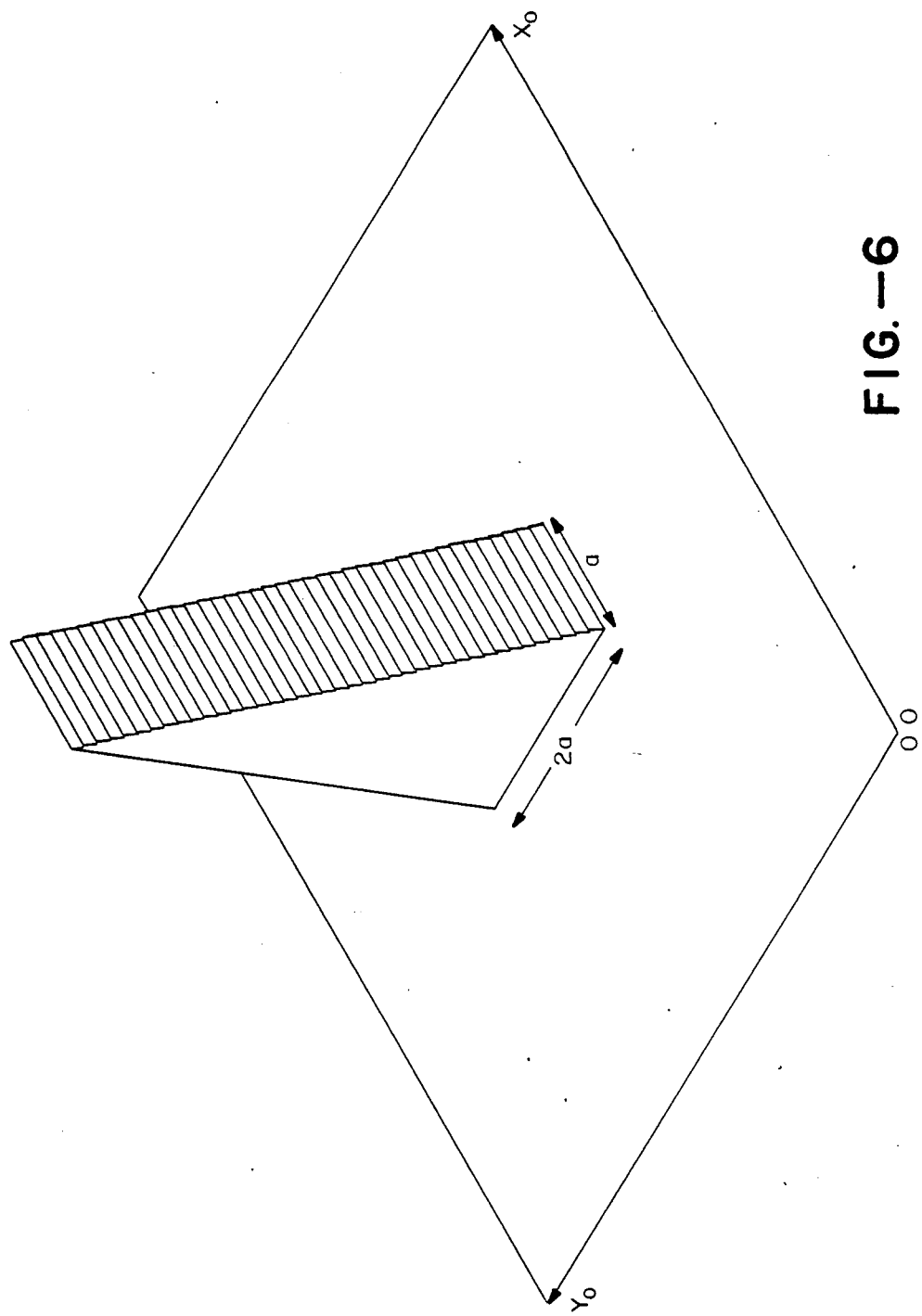
FIG.—6

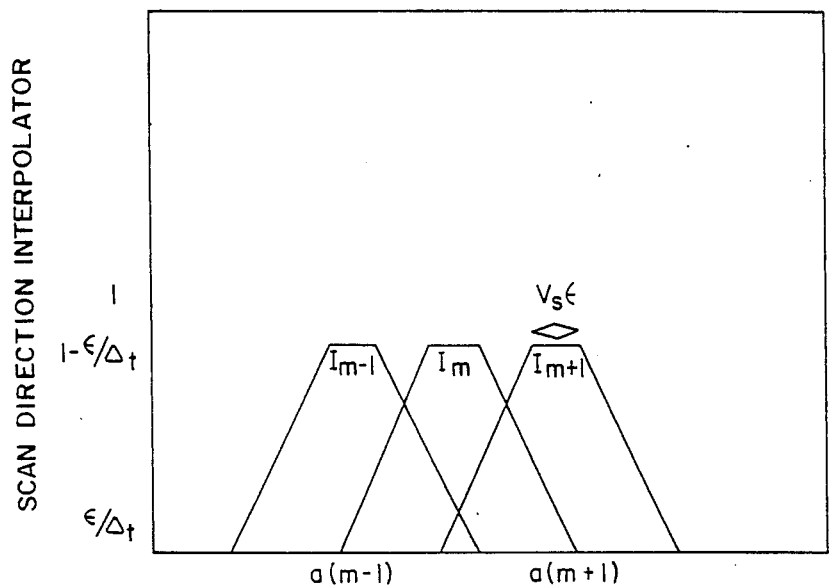
FIG.—10
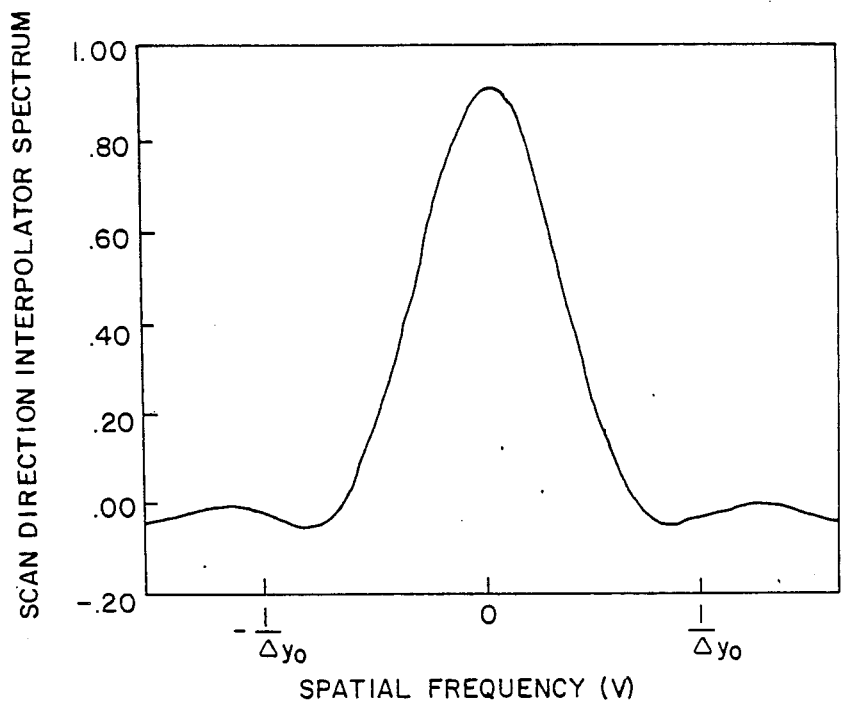
FIG.—11

OPTICAL-DIGITAL HOLOGRAM RECORDING

The U.S. government has rights in the invention pursuant to National Science Foundation Grant No. ECA 79-26432.

This invention relates generally to holography, and more particularly the invention relates to a new and improved method of and apparatus for forming holograms.

Holography relates to the recording of three-dimensional information on a two-dimensional surface. This can be accomplished by recording a Fresnel diffraction pattern of an object in a film. Illumination of the diffraction pattern with a reference wave generates a three-dimensional image of the object.

The generation of the diffraction pattern can be accomplished optically by the interference of a coherent reference light and a coherent light reflected from the object. The resulting interference pattern, or diffraction pattern, can be recorded in film, for example. The hologram appears to the eye as an indecipherable arrangement of fringe patterns on film, absent the reference light.

Use of computer techniques to form a fully digitally synthesized hologram has been proposed. A computer could compute the fringe patterns corresponding to the object, and the fringe patterns could then be recorded directly onto film. The synthetic hologram could then be reconstructed optically by projecting a reference beam (or white light) on the optically recorded hologram.

Digitally synthesized holograms are attractive as a way to display "objects" which do not actually exist, such as engineering designs, or data which arises from intensive processing, such as medical tomographic output. Another potential is for the production of optical elements with exotic properties which could not actually be made physically from glass elements, but whose properties can be expressed mathematically and then used to calculate a transformation of optical fields; this transformation can be manifested in the form of a hologram.

In principle there is no difficulty in producing a hologram digitally. The first step is to calculate the fringe pattern corresponding to light scattered from some mathematically-defined object in interference with a plane reference wave; this calculation follows the optical wave diffraction laws which lightwaves themselves obey in "calculating" holograms optically, and relate to Fourier transforms and Fresnel diffraction patterns. The equations upon which this is based are known and of a standard type. The second step is to record the calculated pattern onto film via some output device, which might be a CRT or plotter, or other method of writing onto film. The resulting hologram is then reconstructed optically.

As a practical matter however, producing a useful hologram digitally is far from trivial, as previous numerical examples make clear. If a high quality display hologram with 18 degree off-axis requires a resolution of 1000 lines per millimeter, then a typical 1000×1000 computer CRT output would, after appropriate reduction, yield a holographic film only 1 millimeter on a side. Viewing such a hologram would clearly be unsatisfactory.

Also, the calculation of each point of such a fringe pattern is extremely computation intensive, since it is related to the Fourier transform of a three-dimensional object with many more pixels; it has been noted that the data compression inherent in such a hologram relates to $1000^2$ hologram to a $2700^3$ 3D object. From this point of view, duplicating by brute-force digital methods the amount of "calculation" that a coherent light wave performs automatically, simply by propagating and diffracting in space, is a formidable task.

An object of the present invention is an improved method of forming a hologram without the need for light projections from an object to be recorded.

Another object of the invention is apparatus for optically forming a hologram without the need for light projecting from an object to be recorded.

A feature of the invention is the use of the mathematical derivative of a diffraction pattern such as the Fresnel diffraction pattern of an object.

Another feature of the invention is the use of the diffraction pattern derivation to control a coherent light beam in optically forming a hologram.

Another feature of the invention is the use of a coherent reference beam and the Fresnel diffraction pattern controlled object beam impinging on a film recording medium from opposite sides of the film.

Briefly, in recording a hologram in a suitable recording medium a two-dimensional complex field distribution of a diffraction pattern of a three-dimensional object is calculated based on a computer model of the object. A beam from a reference coherent light source and a beam from an object coherent light source are directed onto a suitable recording medium. The object light source is modulated in response to amplitude and phase values based on the calculated two-dimensional complex field distribution. The two beams scan the recording medium, the two beams intersecting in the recording medium with the resulting interference pattern being recorded therein.

The reference and the object beams are generated by a suitable visible light laser source. The beams are preferably formed and scanned by means of apertures in opaque plates which are physically moved or are moved by electronically controlled electro-optic crystals.

The complex field distribution can be based on recognized diffraction patterns such as Fraunhofer and Fresnel. The algorithm for calculating a Fresnel diffraction pattern for an object is given by Robert J. Perlmutter, "Contributions to Digital Holography for the Three-Dimensional Display of Medical Imagery" Dissertation submitted to the Department of Electrical Engineering and the Committee on Graduate Studies of Standford University, June 1983 and by Robert J. Perlmutter and Stephen S. Friedland in "Computer Generated Holograms in Biology and Medicine" IEEE Computer Graphics and Applications, August 1983, pgs. 47-51. As described in the IEEE paper, the algorithmm is intended for use in computer generation of a hologram from diagnostic scan (tomographic) data. In accordance with the present invention, a light modulator assembly is provided to control the relative amplitude and phase of an incident plane wave, or object wave, based on the calculated Fresnel diffraction pattern. The inputs to the assembly are precisely the precompensated values of the magnitude and phase of the computed samples of the diffraction pattern to be holographically encoded.

The scanned holographic recorder in accordance with the invention can be described by analogy to the use of the concept of external carrier generation and modulation as used in radio-communications. With the scanned holographic recorder, the high frequency carrier is generated by the interference of two mutually coherent plane waves. The carrier is modulated using the magnitude and phase of the complex Fresnel diffraction pattern samples to locally modulate the fringes of the carrier.

The invention and objects and features thereof will be more readily apparent from the following detailed description and appended claims when taken with the drawing, in which:

FIG. 5 is a block diagram of a spatial light modulator.

FIG. 6 is an interpolation function.

FIG. 7 is a plot illustrating feed direction interpolation.

FIG. 10 is a plot of scan direction interpolation.

FIG. 11 is a plot of scan direction interpolater spectrum.

Figure 1:
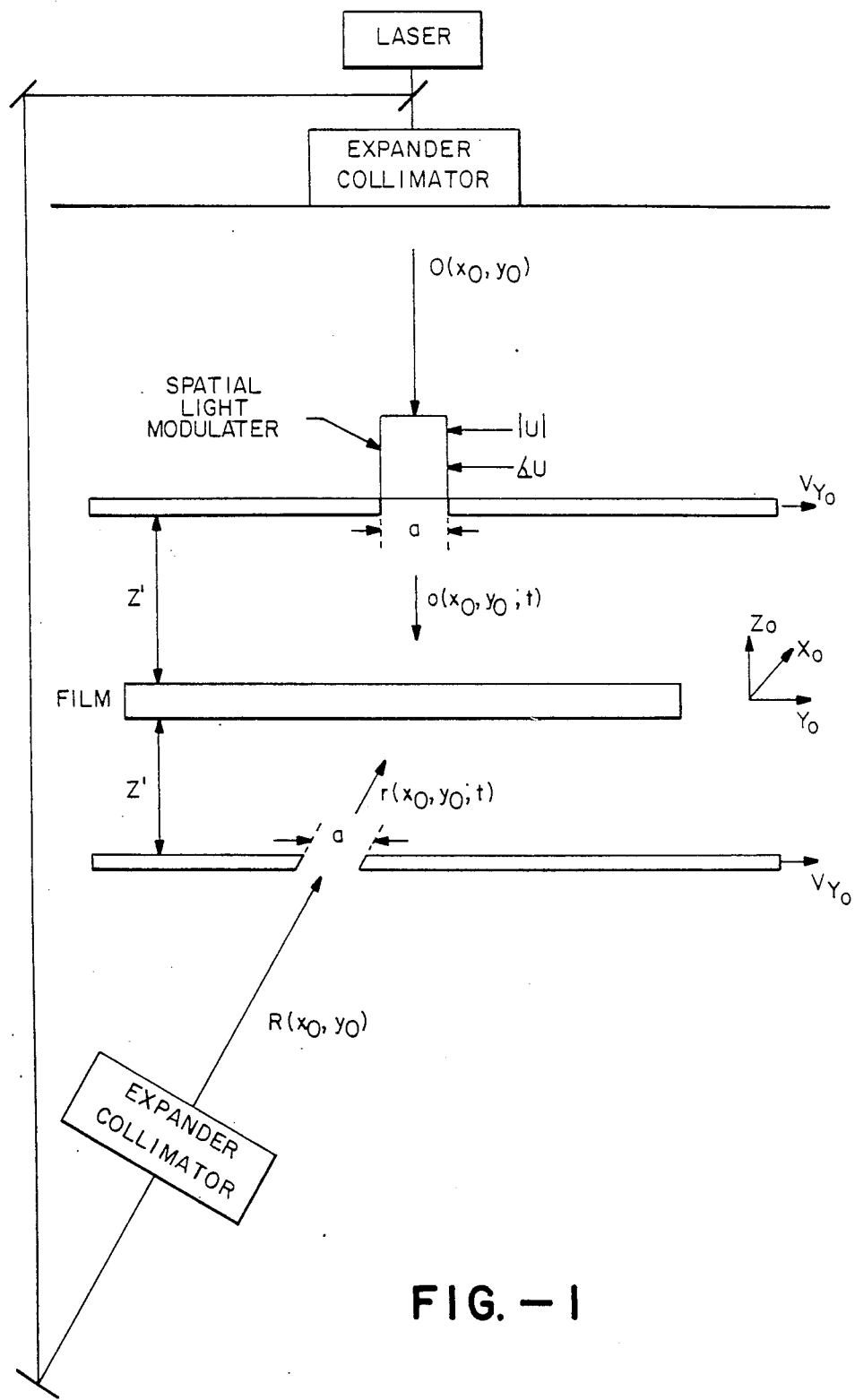
FIG. 1 is a one-dimensional view of a scanned holographic recorder geometry.

As described above, the present invention is a combined optical and digital method of hologram recording. In a preferred embodiment, samples of a complex Fresnel Diffraction pattern of a 3-D object are computed and utilized to control the amplitude and phase of a first coherent light beam (the object beam) as an aperture scan along the surface of one side of the recording medium (e.g. film or crystal) so as to expose only a small portion of the recording medium at any one instant in time with the object beam. At the same time, a second aperture synchronously scans the surface from the opposite side of the recording medium exposing the medium with a second coherent light beam (the reference beam). The two beams are generated by a suitable visible light laser source using suitable optics. As the two apertures scan the medium surface, the transmitted portions of the beams intersect in the recording medium exposing the medium to a holographic interference pattern. In effect, the carrier generated by the intersection of the two beams is modulated by the Fresnel diffraction pattern values for the discrete points and products a reflection hologram in the film.

The calculation of the Fresnel diffraction pattern is set forth by Perlmutter and Friedland, supra. The basic equation of the hologram-recording method is the expression for the transmittance distribution $t(x_o y_o)$ of a light-modulating medium such as film, as follows:

$$I(x_0,y_0) = |R(x_0,y_0)|^2 + |U(x_0,y_0)|^2 + 2R_e|R^*(x_0,y_0)U(x_0,y_0)| \quad (1)$$

where $R(x_0, y_0)$ is a reference wave. $U(x_0,y_0)$ is the complex diffraction field of the source volume, and $R_e$ denotes the real part of the argument. The reference beam is an offset plane wave $$R(x_0,y_0) = \exp|i2\pi\beta y_0|$$

where $$\beta = \frac{\sin(\nu)}{\lambda}$$

and $\nu$ is the angle between a normal to the hologram plane and the Poynting vector of the plane wave.

It in known that the image information is contained in the third term of Equation 1, i.e., the cross term, and that the self-interference term $|U(x_0,y_0)|^2$ is unimportant. In fact, the offset angle $\nu$ can be reduced if this term is not present, thus reducing the bandwidth requirements of the recorder device.

It is interesting to observe that the self-interference term cannot be avoided in optical holography, but in computer-generated holography it can be ignored.

This suggests recording the transmittance function as $$I(x_0,y_0) = 0.5|1 + R_u(x_0,y_0)\cos[2\pi\beta y_0]| \quad (2)$$

where $$R_u(x_0,y_0) = R_e U(x_0,y_0)$$

and $$I_u(x_0,y_0) = I_m U(x_0,y_0).$$

The method of viewing the reconstructed image is to illuminate the hologram with the offset plane wave $R(x_0,y_0)$ and view the virtual image. The aperture in the hologram plane will limit both the field of view and the image resolution. Thus, it is desirable to produce the largest possible hologram The source model.

Our model is a three-dimensional array of monochromatic point sources; the amplitude and phase of each point radiator is proportional to the values of the corresponding datum. We assume that the data are organized into a sequence of k parallel two-dimensional cross sections. Thus, we can define the source distribution $f(x,y;z)$ to be $$f(x,y;z) = \quad (3)$$

$$\sum_{n=0}^{k-1}\sum_{j=0}^{n-1}\sum_{k=0}^{n-1} f_s(j,k;n)\delta(x - j\Delta_x, y - k\Delta_y, z - n\Delta_z)$$

where $\delta(.,.;.)$ is the three-dimensional Dirac delta function, and $\Delta_x$ and $\Delta_y$ are the distances between points in the x and y directions. The values $f_s(j,k;n)$ in general are complex values that correspond to the complex source amplitudes at the points $(j\Delta_x, k\Delta_y, n\Delta_z)$ in the (x,y) plane at distance $Z_0 + n\Delta_z$. The subscript s indicates that the function is defined at discrete points.

The resolution may be greater in the individual cross sections than in the longitudinal direction, as it is in computed tomography and NMR in plane-imaging mode. This kind of asymmetry in the reconstructed data will influence the preferred viewing angles but will not change the basic algorithm to compute the hologram data samples.

The Fresnel diffraction pattern.

To calculate the two-dimensional complex field distribution in the hologram plane $F_\Delta(x_0,y_0)$ from $f(x,y)$, the two-dimensional complex source distribution, we apply the Huygen's-Fresnel principle $$F(x_0,y_0) = \int_{-\infty}^{\infty} \int_{-\infty}^{\infty} f(x,y) \left[ \frac{e^{ikr_{01}}}{i\lambda r_{01}} \frac{z}{r_{01}} \right] dxdy \quad (4)$$

where $\lambda$ = wavelength of light, $k = 2\pi/\lambda$ and $$r_{01} = \sqrt{(x-x_0)^2 + (y-y_0)^2 + (z)^2}$$

is the propagation distance from a point (x,y) in the source plane to a point $(x_0,y_0)$ in the hologram plane. The distance between these planes is z. We now apply the Fresnel approximation $$[(x-x_0)^2 + (y-y_0)^2]^2_{max} < < \frac{4\lambda}{\pi} z^3$$

and assume the obliquity factor $$\frac{z}{r_{01}} \approx 1$$

We obtain the Fresnel diffraction formula in convolutional form:

$$F_\alpha(x_0,y_0) = i\alpha[f(x,y) ** h(x,y)]_{(x_0,y_0)} \quad (5)$$

where $\alpha = 1/\lambda z$, ** represents a two-dimensional linear convolution, and $h(x,y) = \exp(i\alpha\pi[x^2+y^2])$. $h(x,y)$ is the point spread function associated with propagation through free space. Note that we have ignored the phase factor exp (ikz) because it is a constant in the hologram plane, and by choosing z to be a multiple of $\lambda$, its value is 1. Thus, it will not be of importance in the summation of the diffraction patterns of the individual planes. We can now restate the expression for $F_\alpha(x_0,y_0)$ as a Fourier transform:

$$F_\alpha(x_0,y_0) = -i\alpha e^{i\pi\alpha[x_0^2+y_0^2]} \int_{-\infty}^{\infty} \int_{-\infty}^{\infty} \quad (6)$$

$$\{f(x,y)e^{i\pi\alpha[x^2+y^2]}\}e^{-i2\pi\alpha[xx_0+yy_0]} dxdy.$$

To within a multiplicative phase factor, the Fresnel transform of a planar source distribution is a Fourier transform of the source distribution warped by a quadratic term.

Computation of the Fresnel transform.

If we now substitute Equation 3 into the integral of Equation 5 and evaluate it at the sample points $(l\Delta_{x0}, m\Delta_{y0})$ where $\Delta_{x0}$ and $\Delta_{y0}$ are the distances between samples in the $x_0$ and $y_0$ direction in the hologram, we obtain $$F_\alpha(l\Delta_{x0}, m\Delta_{y0}) = -i\alpha[f_s(x,y) ** \exp(i\pi\alpha(x^2+y^2))]_{(l\Delta_{x0}, m\Delta_{y0})} \quad (7)$$

The result is a serial convolution of a coarsely sampled source distribution f(x,y) and the finely sampled quadratic phase function h(x,y). To evaluate this expression, we partition $F_\alpha$ into blocks, each having approximately the same number of points as f(x,y). Each block can then be computed independently of the others by means of an FFT-based algorithm. As a point of interest, note that the algorithm resembles the overlap save method in that the convolution of an image containing a relatively small number of points (e.g., 256×256) with a kernel containing a large number of points (e.g., 2048×2048) is computed in several small adjacent blocks.

$F_{\alpha\eta}$ is evaluated for each plane within the volume. The results are summed to produce a diffraction pattern of the entire volume. Thus, the final calculation is the summation $$U(l\Delta_{x0}, m\Delta_{y0}) = \sum_{\eta=0}^{k-1} F_{\alpha,\eta}(l\Delta_{x0}, m\Delta_{y0}) \quad (8)$$

where k is the total number of image planes in the data volume and $F_{\alpha,\eta}$ is the diffraction pattern in the hologram plane contributed by the nth plane at a distance $1/\alpha_\eta \lambda = z_0 + \eta \Delta_z$ from the hologram plane.

An interferometric scanned holographic recorder

The scanned holographic recorder which is now described is based upon the principle that the high frequency carrier should be generated by the interference of two mutually coherent plane waves. The fundamental concept is to use the magnitude and phase of the complex FDP samples to locally modulate the fringes of the carrier. FIG. 1 depicts a cross-section through the recorder illustrating the basic geometry. The film lies in the $(x_0y_0)$ plane and the square apertures in the screens scan in raster fashion until the entire holographic film is covered.

In the following sections is developed a mathematical description of the transmittance distribution of a hologram which has been exposed using this recorder. The approach will be to first consider the exposure due to to the interfering plane waves $R(x_0,y_0)$ and $O(x_0,y_0)$, then to introduce the scanning apertures and finally, evaluate the full signal including the action of the voltage controlled spatial light modulator (SLM).

The reflection hologram geometry

The plane wave denoted by $O(x_0,y_0)$ impinges upon the "object" side of the film such that its Poynting vector is normal to the film plane. The plane wave denoted by $R(x_0,y_0)$ impinges upon the reference side of the film at an angle $\theta$ with respect to a line perpendicular to the film plane. The plane waves are introduced on opposite sides of the film so that the SLM and attached screen do not cast shadows or cause diffraction effects distorting each other as they impinge upon the film plane. The implications of this, so called, reflection hologram geometry upon the viewing of the hologram will now be considered.

In the absence of the SLM and scanning apertures the stationary plane waves, $R(x_0,y_0)$ and $O(x_0,y_0)$ would expose the entire holographic film. During the exposure, wave normals and the lines of constructive interference move through the emulsion, tracing out planes of high exposure. Simple geometry indicates that these planes bisect the angle between the two wave normals and that they occur periodically throughout the emulsion. If the photographic plate is developed, silver atoms will appear in platelets along the planes of high exposure. Because the angle between the interfering plane waves is $\pi - \theta \approx \pi$ radians, it is seen that the platelets will lie nearly parallel to the surface of the film. The spacing $\Lambda$ between these planes of platelets will be:

$$\Lambda = \frac{\lambda}{2\sin\left[\frac{(\pi-\theta)}{2}\right]} \quad (9)$$

In our case $$\Lambda \approx \frac{\lambda}{2}.$$

The collection of parallel planes of platelets form a high frequency grating. It is this grating structure which serves as the spatial carrier in a reflection hologram. Before discussing the method proposed to modulate the phase and depth of the carrier, I shall discuss the implications of the reflection geometry upon the configuration required to view a reconstructed image.

If one wishes wish to reconstruct $O(x_0,y_0)$ by illuminating the developed film, or photographic plate, with a plane wave one must determine the required angle of illumination. Addressing this point, the reflecting mirror which diverts part of the incident plane wave in accordance with the usual laws of reflection. . . . If the various reflected plane waves are to add in phase, then it is essential the path lengths traveled by waves reflected from adjacent platelets differ by precisely one [or any integer number of] optical wavelength(s).

This leads to the Bragg condition which states that the angle of illumination, $\Psi$, must satisfy the condition:

$$\sin(\psi) = \pm \frac{\lambda}{2\Lambda} \qquad (10)$$

An interesting implication of this condition is that if one uses use a broadband light source to illuminate the hologram only the wavelength satisfying the Bragg condition will be reflected. The other colors will be either partially absorbed or simply pass through the film. Thus, the person who wishes to view a reconstructed image need not have a laser or other special light source.

This represents an important advantage of reflection holograms. This is the first holographic recorder which has the capability of recording a reflection hologram based upon digital image data.

I shall now describe the apertures and consider their diffraction patterns in the film plane. I shall use knowledge of their diffraction patterns to illustrate the way in which the fringe formation can be locally controlled. Then I shall detail the parameters of their scanning motion.

The scanning apertures

The darkened regions in FIG. 1 indicate opaque screens which are large enough to block the incident light from exposing the film except in the region illuminated by the light passing through the apertures in these screens. The shape of these apertures can be either circular or square but should have a diameter or edge length, $a$, which, as shall be seen, is approximately equal to the spacing between the FDP samples. For present purposes let us shall assume that the apertures are, in fact, identical and square so that (temporarily disregarding their scanning motions) they are mathematically modeled by $$rect_2\left(\frac{x_0^1}{a}, \frac{y_0^1}{a}\right)$$

in the aperture planes. The primed coordinates remind one that the apertures do not lie in the film plane itself.

The light waves, passing through the apertures, propagate to the film plane and continue on through the emulsion. In the emulsion the interference of the propagating waves, shaped by the diffraction patterns of the apertures, locally forms a set of finges, as described in the previous section. The spreading diffraction patterns of the apertures determine the area of exposure (fringe formation) at any given time during the scanning. It is the widths of the aperture diffraction patterns that determine the maximum bandwidth of the digitally computed Fresnel diffraction patterns which may be encoded with this recorder. Hence, the nature of the aperture diffraction patterns must be considered so that the width of the narrowest achievable diffraction pattern may be determined. This will allow one to specify the recorder resolution in terms of the aperture dimensions and distance from the film.

Figure 2:
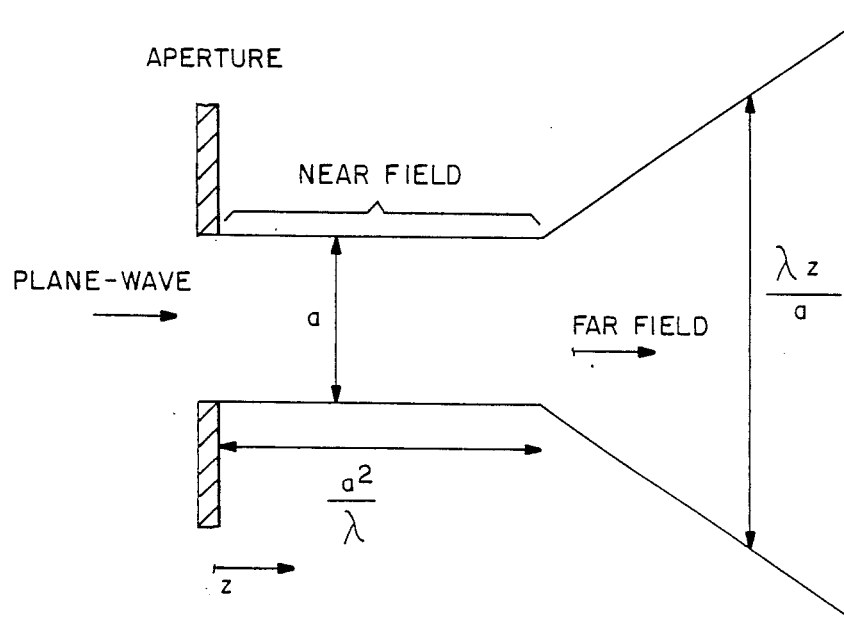
FIG. 2 is an illustration of diffraction regions in a hologram.

The shape of the diffraction pattern throughout the thickness of the film emulsion depends upon the relationship of the illuminating light wavelength, aperture width, and the propagation distance. Based upon the assumptions of the scalar theory of diffraction, which has been used herein, the various diffraction regions have been illustrated as shown in FIG. 2. Deep within the field, but beyond $10\lambda$, the diffraction pattern is approximately the geometric projection of the aperture. Thus, in this region the width of the diffraction pattern is equal to that of the aperture itself. As the propagation distance increases the diffraction pattern becomes a more complicated, Fresnel diffraction pattern. Then, it eventually begins to appear as a far field, Fraunhofer diffraction pattern. This takes place at approximately $$\frac{a^2}{\lambda},$$

as shown in the figure. In this region the width of the diffraction pattern grows as $$\frac{\lambda z}{a}.$$

Table 1 is a tabulation of the diffraction pattern widths at the center of the film emulsion, assuming a thickness of $20\lambda$. I computed the results for several aperture widths and propagation distances to the film surface for each. The approximations indicated in FIG. 2 were used in the computations. It was seen that the scanning apertures will have to be within a few wavelengths of the film surface in order to maintain a high resolution system. The point is, however, that the resolution sought ($5-10\lambda$) for a 3-D display is achievable.

Attention is now returned to the mathematical description of the diffraction patterns and then proceed to discuss the scanning motion itself.

TABLE (1)

| Diffraction pattern width in $\lambda$ vs. aperture size and distance | | | | |
|---|---|---|---|---|
| | $z_0'/\lambda$ | | | |
| $a/\lambda$ | 1.0 | 2.0 | 5.0 | 10.0 |
| 1.0 | 11.0 | 12.0 | 15.0 | 20.0 |
| 2.0 | 5.5 | 6.0 | 7.5 | 10.0 |
| 3.0 | 3.7 | 4.0 | 5.0 | 6.7 |
| 4.0 | 4.0 | 4.0 | 4.0 | 5.0 |
| 5.0 | 5.0 | 5.0 | 5.0 | 5.0 |

The diffraction phenomenon, occurring throughout the regions depicted in FIG. 2, may be modeled as Fresnel diffraction.

Denoting the diffraction kernel by $d_2(x_0,y_0)$, then, the diffraction pattern in the film plane due to the aperture is $$rect_2\left(\frac{x_0}{a}, \frac{y_0}{a}\right) ** d_2(x_0,y_0),$$

where ** indicates 2-D convolution. A property of the kernels that will be used is their separability, $d_2(x_0,y_0)=d_1(x_0)d_1(y_0)$. Using this property one sees that the diffraction pattern in the film plane due to the apertures may be expressed as the product of convolutions:

$$\left[rect_1\left(\frac{z_0}{a}\right) * d_1(x_0)\right]\left[rect_1\left(\frac{y_0}{a}\right) * d_1(y_0)\right].$$

This leads to the useful definition $$g_1(x_0) \stackrel{\Delta}{=} rect_1\left(\frac{x_0}{a}\right) * d_1(x_0). \tag{11}$$

Because the functional dependence of the distribution is the same in the $x_0$ and $y_0$ directions we can use $y_0$ as the argument of the function as well.

Since the aperture on the reference side of the film is illuminated by a tilted plane wave its geometric projection onto the film plane will be tilted and shifted by the amount $x_0'\tan(\theta)$ in the $y_0$ direction. Using $d_2(x_0,y_0) = e^{i\pi a |x_0^2+y_0^2|}$, it is easily seen that, to within a complex phase constant, the diffraction pattern of the shifted aperture illuminated by the offset plane wave is equivalent to the product of the diffraction pattern of the aperture illuminated by a normally incident plane wave and $e^{|i2\pi\beta y_0|}$. Mathematically we have:

$$e^{i\pi\lambda z_0 |\beta^2}\left\{\left[e^{|i2\pi\beta y_0|}rect_2\left(\frac{x_0}{a}, \frac{y_0-\beta\lambda z_0^1}{a}\right)\right]**d_2(x_0,y_0)\right\} = \tag{12}$$

$$\left[e^{|i2\pi\beta y_0|}rect_2\left(\frac{x_0}{a}, \frac{y_0}{a}\right)\right]**d_2(x_0,y_0),$$

where $$d_2(x_0,y_0) = e^{i\frac{\pi}{\lambda z_0^1}|x_0^2+y_0^2|}$$

and $\beta\lambda z_0' \simeq z_0'\tan(\theta)$. This approximation holds when the convolution model is valid.

Therefore we may translate the center of the aperture on the reference side of the film by the amount $z_0'\tan(\theta)$ in the $y_0'$ direction so that its diffraction pattern physically coincides with that due to the aperture on the object side of the film. This relative displacement of the aperture centers is shown in both FIGS. 1 and 3. In the latter figure are shown the details of the local fringe formation due to the interference of the diffraction patterns of the two apertures. The planes of maximum interference, traced out by the propagating diffraction patterns, are bounded by the boundaries of the volume of their intersection. In the figure, they are outlined by the dotted lines. The spacing between them will be modulated by the particular diffraction pattern sample modulating $O(x_0,Y_0)$; I have indicated the spacing $\Lambda$ which will be roughly their average separation.

The remainder of this exposition will be concerned with the diffraction patterns of the apertures in the film plane. Because they obviously follow the apertures themselves one need not refer to the relative displacement of the apertures in the ensuing discussions. Furthermore, the velocity of the scanning apertures will be examined from the point of view of the moving diffraction patterns. Thus, the velocity (and position) versus time curves describing the motion of the diffraction patterns of the two apertures will be identical. For ease of discussion, however, I shall simply refer to the moving apertures rather than the moving diffraction pattern of the apertures in the film plane.

The screens (and apertures) are moved in synchronism in a raster scanning type motion so that eventually the entire area of the holographic film is exposed. The velocity in the $y_0$, scan, direction is $v_{y0}(t)$. The motion in the scan direction is continuous from one edge of the hologram to the other. Once an edge is reached the apertures step a distance $a$ in the $x_0$, feed, direction and then scan along $y_0$ in the reverse direction. The velocity of the scanning apertures in the feed ($x_0$) and scan ($y_0$) directions are plotted in FIG. 4 as functions of time. Note that they are periodic and timed so that the motion is always purely in the feed or scan directions. The coordinates of the centers of the scanning apertures are given by the expressions $$x_\epsilon = \int_0^t v_{x0}(s)ds$$

and $$y_\epsilon = \int_0^t v_{y0}(s)ds.$$

(Again, I refer to the coordinates of the centers of the diffraction patterns of the apertures lying in the film plane. The center of the aperture on the reference side of the film is actually translated by the distance $z_0'\tan(\theta)$ in the $y_0'$ direction). The third graph in the figure is the blanking pulse, $b(t)$, as a function of time. This signal controls shutters so that both the object and reference beams are blocked during the feed motion of the apertures. It is assumed that the motion follows the curves of FIG. 4 exactly, therefore, $$b(t) = \sum_t rect_1\left(\frac{t-\left[l(\Delta s+\Delta f)+\frac{\Delta s}{2}\right]}{\Delta f}\right).$$

If the aperture requires time to build up to speed and to brake, the blanking pulse can be applied so that these lag times will not affect the recorded exposure pattern. Therefore the scanning apertures are modelled together with the blanking signal, $$\Lambda(x_0,y_0,\cdot t) = \left\{ g_1(x_0) * \delta\left[ x_0 - \int_0^t v_{x0}(s)ds \right] \right\} \left( g_1(y_0) * \delta\left[ y_0 - \int_0^t v_{y0}(s)ds \right] \right) b(t) \quad (13)$$

in the film plane. $\Lambda(x_0,y_0;t)$ is separable in its spatial variables. As has been shown above, in the case of the aperture on the reference side of the hologram, the distribution in the film plane is (to within a complex phase constant) $e|^{i2\pi\beta 0}|\Lambda(x_0,y_0;t)$. Of course, if the plane wave illumination is normally incident upon the aperture; but, it has undergone a relative phase delay and attenuation, the aperture distribution in the film plane is represented by the product of $\Lambda(x_0,y_0;t)$ and the complex number representing this complex attenuation. Thus, in these cases one merely multiplies $\Lambda(x_0,y_0;t)$ by the complex constant or function, as the case may be, to express the resulting distribution in the film plane.

Modulating the carrier: the Spatial Light Modulator (SLM)

The function of the spatial light modulator assembly (SLM) is to control the relative amplitude and phase of the incident plane wave, $O(x_0,y_0)$. The inputs to the SLM are precisely the precompensated values of the magnitude and phase of the computed samples of the diffraction pattern to be holographically encoded.

The input voltage should be precompensated according to a look up table so that the amplitude and phase of the transmitted plane wave are linearly related to the desired (calculated) complex sample value. Before discussing the timing of the applied control voltages I shall describe one possible configuration of electrooptic crystals and a pair of crossed polarizers which will permit the modulation of the phase and amplitude of the incident plane wave.

There are many ways in which the phase and amplitude modulation of a plane wave may be achieved. FIG. 5 shows one possible configuration of Pockels cells and crossed polarizers to accomplish the desired amplitude and phase modulation. The first polarizer guarantees that the incident plane wave is linearly polarized and that its polarization is parallel to the x and y axes of the crystal, as shown. This crystal should be cut so that the x and y axes are at 45° to the electrically induced birefringent axes. The electric field strength applied across the faces of the crystal is varied in accordance with the desired value of transmitted light amplitude (the magnitude of the complex data sample to be encoded). Through the linear electrooptic (Pockels) effect the polarization of the propagating plane wave is altered by the applied field. The second polarizer then analyzes the plane wave transmitted through the crystal. It can be shown that the ratio of the amplitude of the exiting plane wave to the incident plane wave is $$\sin\left( \frac{\pi V}{2V_s} \right)$$

where $V_s$ depends upon the crystal material and cut and V is the control voltage.

The second electrooptic crystal is also oriented with its optic axis aligned with the direction of propagation. In this case, however, the polarization of the linearly polarized incident plane wave is parallel to one of the electrically induced birefringent axes, denoted by x' and y' in FIG. 5. Thus, a single plane wave propagates through the crystal. The index of refraction is directly modulated by the applied field so that the effective optical path length through the crystal is controlled. Although the figure indicates that the applied voltage is a function of the phase of U it should also be a function of the magnitude of U in order to compensate for any voltage dependent phase delay introduced by the amplitude modulator.

Figure 4:
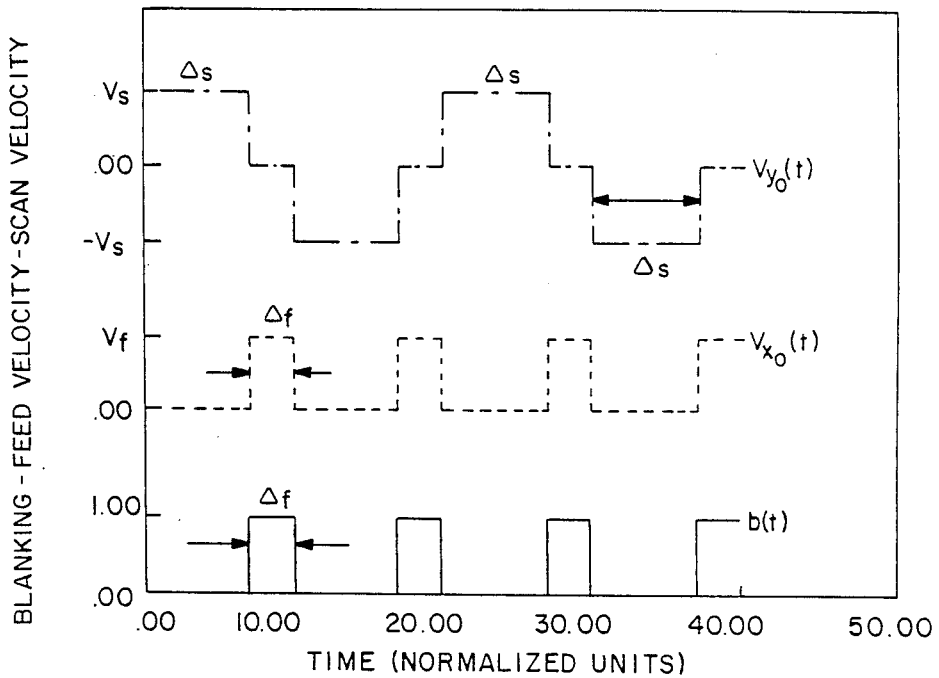
FIG. 4 is a plot of scanner velocity and blanking profile.
Figure 3:
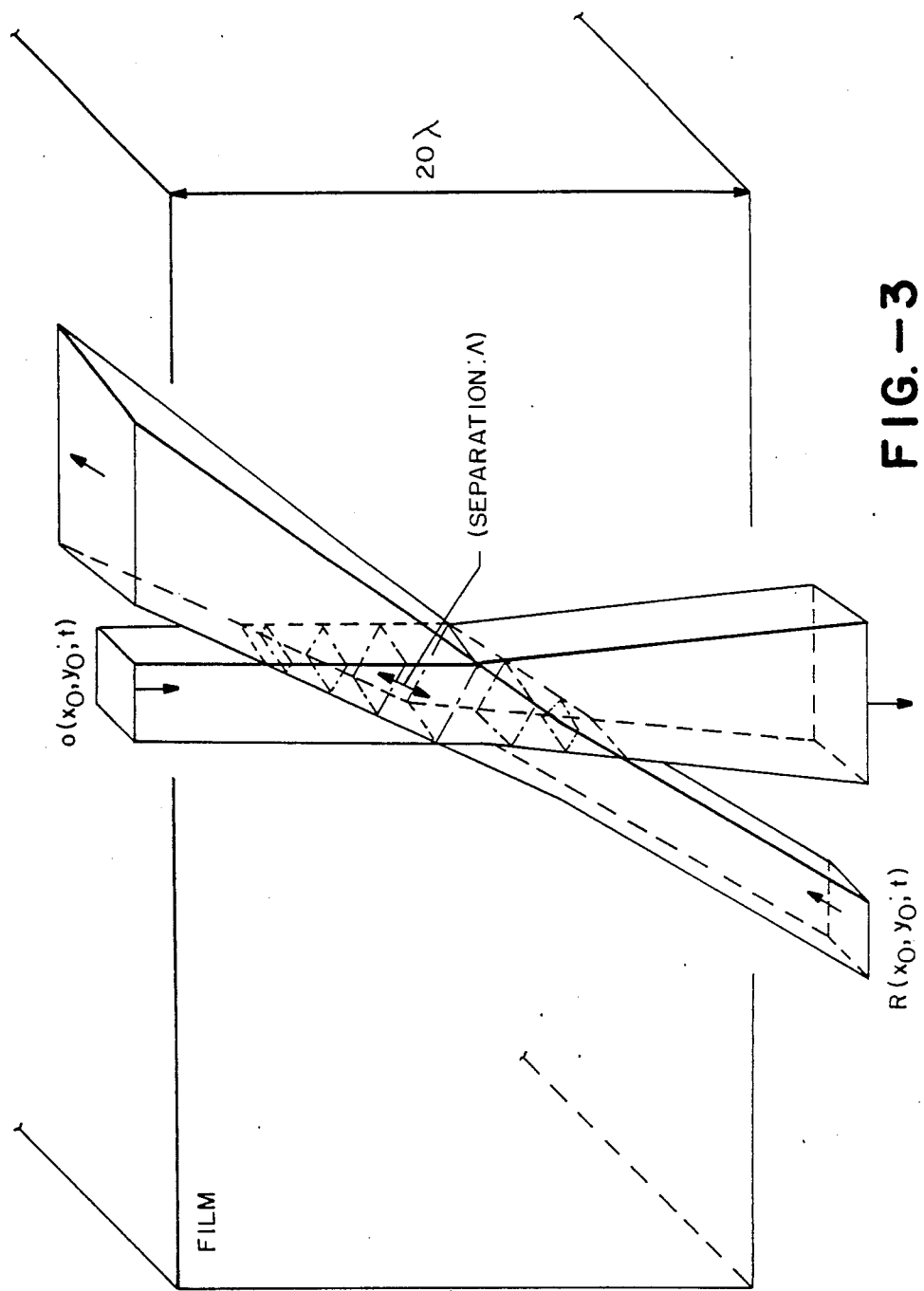
FIG. 3 is a schematic illustration of fringe formation due to scanning aperture.

There are commercially available units which implement each of the stages of FIGS. 3–5. The amplitude modulators are moderate cost devices which can operate at up to 100 MHZ. That is, a small amplitude sinusoidal controlling voltage of up to 100 MHZ will cause a 100 MHZ sinusoidal variation in the output intensity of the modulated plane wave. Similarly there are longitudinal electrooptic phase modulators which exhibit wide bandwidth characteristics and provide the full range of phase delay from $-\pi$ to $\pi$. As mentioned earlier, it is a simple task to implement a lookup table or other approach to precompensate the control voltages so that the desired linear modulation of phase and amplitude is achieved. Therefore we shall assume that $O(x_0,y_0)$ is perfectly modulated in amplitude and phase by the magnitude and phase of the diffraction pattern samples.

Attention is now turned to the timing and coordination of the scanning motion with the application of the samples of the FDP to the SLM. It is assumed that the magnitude and phase of the FDP has been evaluated at discrete points $(l\Delta_{s0}, m\Delta_{y0})$ for some finite range of l and m.

The $(l,m)^{th}$ complex sample will be represented by $U(l\Delta_{x0}, m\Delta_{y0})$. The 2-D matrix of magnitude and phase samples must be read out and converted to voltages which are applied to the SLM at the correct time. Thus one must convert the matrix of samples to a pair of time signals. Of course, the conversion takes place in a manner exactly parallel to the scanning itself. This conversion is now described. For the sake of clarity, continue to refer to the individual data samples by their spatial locations or matrix coordinates.

Consider the $l^{th}$ scan row and assume l is an even number. At $t = l(\Delta_f + \Delta_0)x_c = l\Delta_f v_f$ and $y_c = 0$. The magnitude and phase of the $U(l\Delta_{x0},0)$ is applied to the SLM. This remains applied until $$y_c = \frac{\Delta_{s0}}{2}$$

which implies $$t = l(\Delta_f + \Delta_z) + \frac{\Delta_{s0}}{2v_s}.$$

At this time the data corresponding to $U(l\Delta_{x0},\Delta_{y0})$ is applied. This remains for $$\Delta_t = \frac{\Delta_{s0}}{v_s}$$

seconds (using a 0-order sample and hold circuit with a hold time of $\Delta$ seconds), and then the next data sample is applied and so on. When the end of the row is reached (at $t=l(\Delta_f+\Delta_s)+\Delta_s$) the next row of the data matrix is be applied. This procedure is repeated until the entire hologram is recorded.

The mathematical description of this procedure is quite simple. Voltages corresponding to the $(l,m)^{th}$ sample are applied to the SLM when the function $$S(t) = rect_1\left[\frac{x_\epsilon - l\Delta_{s0}}{\Delta_{s0}}\right] rect_1\left[\frac{y_\epsilon - m\Delta_{s0}}{\Delta_{s0}}\right] = \text{equals unity.}$$

The value of this function is unity if the center of the scanning aperture (on the object side) is over the region $$(x_0,y_0) \in \left(l\Delta_{s0} \pm \frac{\Delta_{s0}}{2}, m\Delta_{s0} \pm \frac{\Delta_{s0}}{2}\right)$$

and zero otherwise. The interpretation of $$rect_1\left[\frac{x_\epsilon - l\Delta_{s0}}{\Delta_{s0}}\right]$$

is clear; data from the $l^{th}$ row of the matrix are applied only during the scanning of the $l^{th}$ line. That is $$\left[\frac{k\Delta_f v_f - l\Delta_{s0}}{\Delta_{s0}}\right] = \delta_H,$$

where $\delta_H$ is the Kronecker delta function. The function $$rect_1\left[\frac{y_\epsilon - m\Delta_{y0}}{\Delta_{y0}}\right]$$

represents the 0-order hold circuit action. Its value is one for the time duration $\Delta_f$ as defined above.

Finally, then, the magnitude and phase of the complex samples multiply the diffraction pattern of the scanning aperture in the film plane. The modulated optical signal striking the film plane, indicated by $o(x_0,y_0;t)$ in FIG. 1, is mathematically represented by:

$$o(x_0,y_0;t) = \sum_l \sum_m U(l\Delta_{x0},m\Delta_{y0})rect_1\left[\frac{x_t - l\Delta_{x0}}{\Delta_{x0}}\right] rect_1\left[\frac{y_t - m\Delta_{y0}}{\Delta_{y0}}\right] A(x_0,y_0;t). \quad (14)$$

One notes that the temporal variations of the signals $$\left(\frac{\Delta_{s0}}{v_s}\right)$$

are slow relative to the optical frequency of the coherent illumination. Thus one may continue to use phasor notation without error.

The recorded signal: A mathematical analysis

The analysis of the recorded distribution will be treated as a linear systems problem and use the mathematics of linear systems theory to determine its characteristics. The intention is to investigate the various components of the recorded distribution for two purposes. The first, is to compare the components of the resultant transmittance distribution to those found in purely optical holography. Thus it will be shown that the film exposed by this recorder will, in fact, become the desired hologram upon development. Having done that, one then wants to examine the sensitivity of the spatial frequency characteristics of the recorder to some of the important design parameters. In this way one will be able to specify tolerances for these parameters.

In the calculations to follow integrals will be evaluated similar in form to:

$$\int_0^T b(t)h\left[x_0 - \int_0^t v_{s0}(s)ds, y_0 - \int_0^t v_{s0}(s)ds\right] dt,$$

where $h(x_0,y_0)$ is a function of the diffraction pattern of the apertures. In order to gain insight into the mathematical description of the recorder, understand its spatial frequency characteristics, and simplify the analysis of the recorded exposure distribution to follow, it is useful to a develop an approach to analytically reducing this integral.

Because the blanking pulses will zero the integrand between row scans, such integrals can be partitioned into time segments corresponding to the exposure of the individual rows or strips of the hologram. FIG. 4 indicates that the row scan time is $\Delta_s$ and that the feed time is $\Delta_f$. Thus the natural partitioning of this integral, as forced by b(t), is:

$$\int_0^T b(t) h\left[x_0 - \int_0^t v_{s0}(s)ds, y_0 - \int_0^t v_{s0}(s)ds\right] dt = \quad (15)$$

$$\sum_l \int_{l(\Delta_s+\Delta_f)}^{|l(\Delta_s + (\Delta_f+\Delta_s)|} h\left[x_0 - \int_0^t v_{s0}(s)ds, y_0 - \int_0^t v_{s0}(s)ds\right] dt$$

Each value of l corresponds to the $l^{th}$ row of the hologram. The value of $$\int_0^t v_{s0}(s)ds$$

is precisely $l\Delta_f v_f$ during the scanning of the $l^{th}$ row. Furthermore the scan speed is the constant $v_0$. The direction of scanning motion depends upon the row number. For even numbered rows the velocity is positive and for odd numbered rows it is negative. Clearly this should have no effect upon the recorded distribution once the recording is complete, but this statement requires proof which is now presented.

The summation of eq. (3-6) is separated into the even numbered rows and the odd ones. One has:

$$\sum_{l \text{ even}} \int_{l(\Delta_s + \Delta_f)}^{|l(\Delta_s + \Delta_f) + \Delta_s|} h\left[x_0 - \int_0^t v_{s0}(s)ds, y_0 - \int_0^t v_{s0}(s)ds\right] dt$$

and $$\sum_{l \text{ odd}} \int_{l(\Delta_s + \Delta_f)}^{|l(\Delta_s + \Delta_f) + \Delta_s|} h\left[x_0 - \int_0^t v_{s0}(s)ds, y_0 - \int_0^t v_{s0}(s)ds\right] dt.$$

For the even numbered rows the velocity is positive, so one uses the substitution $t' = t - l(\Delta_s + \Delta_f)$. ($t' = 0$ at the beginning of the $l^{th}$ row scan). The integral then takes the form $$\int_0^{\Delta_s} h[x_0 - l\Delta_f v_f, y_0 - v_s t^1]dt^1.$$

For the odd numbered rows the velocity is negative, so one uses the substitution $t' = \Delta_0 - (t - l(\Delta_s + \Delta_f))$. It is easily seen that the integral will again take on the form $$\int_0^{\Delta_s} h[x_0 - l\Delta_f v_f, y_0 - v_s t^1]dt^1.$$

Hence, $$\int_0^T b(t)h\left(x_0 - \int_0^t v_{s0}(s)ds, y_0 - \int_0^t v_{s0}(s)ds\right) dt = \quad (16)$$

$$\sum_t \int_0^{\Delta_s} h[x_0 - l\Delta_f v_f, y_0 - v_s t^1]dt^1.$$

This is a two-dimensional convolution involving $h(\ )$. In the $x_0$ direction the convolution kernel is a discretely sampled $rect_1(\ )$ function. In the $y_0$ direction has a continuous convolution of a $rect_1(\ )$ function and $h(\ )$. Using the convolution notation one may rewrite eq. (3-7) as:

$$\int_0^T b(t)h\left[x_0 - \int_0^t v_{s0}(s)ds, y_0 - \int_0^t v_{s0}(s)ds\right] dt = \quad (17)$$

-continued $$\left\{h(x_0, y_0) ** \left[\sum_t \delta(x_0 - l\Delta_{s0})rect_1\left(\frac{y_0 - \frac{v_s \Delta_s}{2}}{v_s \Delta_s}\right)\right]\right\}.$$

The validity of eq.s (16,17) establishes the fact that the integration will be independent of the particular raster scan directions; i.e. the system could be designed to always scan the rows in the same direction (as is done in television systems) or the raster velocities can follow those of FIGS. 3–4.

The scanning pattern is chosen corresponding to the velocities of FIGS. 3–4 in order to minimize the mechanical motion necessary to scan the entire film. One last observation is that if $h(x_0,y_0) = h_1(x_0)h_1(y_0)$ (as will oftein be the case) then one has:

$$\int_0^T b(t)h\left(x_0 - \int_0^t v_{s0}(s)ds, y_0 - \int_0^t v_{s0}(s)ds\right) dt = \quad (18)$$

$$\left\{h_1(x_0) * \sum_t \delta(x_0 - l\Delta_f v_f)\right\} \left\{h_1(y_0) * rect_1\left(\frac{y_0 - \frac{\Delta_s v_s}{2}}{\Delta_s v_s}\right)\right\}.$$

This property of $h(\ )$ will be useful in simplifying the analysis to follow.

Defining the optical field which impinges upon the reference side of the film as $\tau(x_0,y_0;t)$, the amplitude transmittance, $t(x_0,y_0)$, of the developed film will be proportional to:

$$t(x_0,y_0) = \int_0^T |\tau(x_0,y_0;t) + o(x_0,y_0;t)|^2 dt, \quad (19)$$

where $\tau(x_0,y_0;t) = R(x_0,y_0)\Lambda(x_0,y_0;t)$ and $\Lambda(x_0,y_0;t)$ is defined in eq. (13). The "object" wave, $o(x_0,y_0;t)$ has been defined in eq. (14). Expanding this integral one has three terms of interest. These are: the "bias" term $$\tau_1(x_0,y_0) \triangleq \int_0^T |\tau(x_0,y_0;t)|^2 dt;$$

the self-interference term $$\tau_2(x_0,y_0) \triangleq \int_0^T |o(x_0,y_0;t)|^2 dt;$$

and the cross-term containing the real and conjugate image information $$\tau_3(x_0,y_0) \triangleq \int_0^T 2Re\{\tau(x_0,y_0,\cdot t))^* \tau(x_0,y_0,\cdot t)\} dt.$$

Each of these terms will be analyzed separately.

The bias term:

The bias term is studied by determining its spectral content. This will clearly indicate the effects of the scanning motion upon the term. Substituting the expression for $\Lambda(x_0,y_0,\cdot t)$ into the integral one gets:

$$\tau_1(x_0,y_0) = \int_0^T \left| R(x_0,y_0) \left[ rect_2 \left( \frac{x_0 - \int_0^t v_{x0}(s)ds}{a}, \frac{y_0 - \int_0^t v_{y0}(s)ds}{a} \right) **d_2(x_0,y_0) \right] b(t) \right|^2 dt$$

One may take advantage of the separability of $d_2(x_0,y_0)$ and express the above integral in terms of the function $g_1(\ )$ defined in eq. (3-3).

$$\tau_1(x_0,y_0) = \int_0^T \left| R(x_0,y_0) \left\{ g_1(x_0) * \delta \left( x_0 - \int_0^t v_{x0}(s)ds \right) \right\} \left\{ g_1(y_0) * \delta \left( y_0 - \int_0^t v_{y0}(s)ds \right) \right\} \right|^2 b(t)dt \qquad (20)$$

where I have used the fact that $|b(t)|^2 \equiv b(t)$. Noting that $|R(x_0,y_0)|^2 \equiv 1$, this integral is recognized to be of the same form as that in eq. (15). I identify $|g_1(.)|^2$ with $h_1(.)$ and skip immediately to the reduced result. One has:

$$\tau_1(x_0,y_0) = \left\{ |g_1(x_0)|^2 * \sum_l \delta(x_0 - l\Delta_f y_f) \right\} \left\{ ||g_1(y_0)|^2 * rect_1 \left[ \frac{y_0 - \frac{\Delta_s v_s}{2}}{\Delta_s v_s} \right] \right\},$$

where the fact is used that for integrable functions f(x): $|f(x)|^2 * \delta(x-x') = |f(x-x')|^2$. Applying the separable 2-D spatial Fourier transform operator to this expression one gets the Fourier transform of the bias term, $\tau_1(u,v)$:

$$\tau_1(u,v) = \qquad (21)$$

$$e^{-i\tau |\Delta_f v_f s(N-1) + v_s \cdot \Delta_s v|} \frac{\sin(\pi \Delta_f v_f N u)}{\sin(\pi \Delta_f v_f u)} \mathrm{sinc}(\Delta_s v_s v) \dot{G}_1(u) \dot{G}_1(v)$$

where u and v are the spatial frequency variables corresponding to $x_0$ and $y_0$, respectively. $G_1$ represents the 1-D Fourier transform (with respect to the spatial variable) of $|g_1(\ )|^2$.

The "hat" indicates the Fourier transform of the corresponding function.) The term $$e^{-i\tau \Delta_f v_f s(N-1)} \frac{\sin(\pi \Delta_f v_f N u)}{\sin(\pi \Delta_f v_f u)}$$

is the well known discrete interpolator function.

The linear phase factors do not affect the bandwidth and of course, $\dot{G}_1(u)\dot{G}_1(v)$ is the expected autocorrelation of the Fourier transform of the scanning apertures. In the ideal case $d_2(x_0,y_0) = \delta(x_0,y_0)$ (i.e. there is no spreading in the diffraction pattern) and $\dot{G}_1(u)\dot{G}_1(v) = |\alpha|^2 \mathrm{sinc}(3u,av)$ (recall that $rect^2(\ ) = rect(\ )$). The discrete scanning in the $x_0$ direction behaves, mathematically, as a convolution with a discretely sampled rectangle function. This gives rise to the discrete interpolator in the frequency domain. It is the interpolator function which limits the bandwidth in the u direction. In the $y_0$ direction the motion is continuous. Thus, one sees the corresponding sinc( ) term. It is this function which limits the bandwidth in the v direction. Notice that as $\Delta_0$ increases, holding $v_0$ constant (i.e. as the width of the recorded hologram increases), the corresponding bandwidth decreases. If the dimensions of the hologram were infinite then the spectrum would be non-zero at $(u,v) = (0,0)$ only.

The self-interference term:

The self-interference term, $T_2(x_0,y_0)$, may be analyzed in the same way as the bias term. I begin with the complete expression for this term using the definition for $o(x_0,y_0;t)$ given in eq. (14):

$$T_2(x_0,y_0) = \int_0^{T_s} \left| \sum_l \sum_m U(l\Delta_{x0}, m\Delta_{y0}) rect_1 \left[ \frac{x_c - l\Delta_{x0}}{\Delta_{x0}} \right] rect_1 \left[ \frac{y_c - m\Delta_{y0}}{\Delta_{y0}} \right] \Lambda(x_0,y_0;t) \right|^2 dt.$$

Determination of its bandwidth requires the evaluation of the Fourier transform of the expression. To facilitate this the integral is partitioned into the row-scan-intervals and use the separability of the aperture functions.

$$T_2(x_0,y_0) = \sum_k \int_0^{\Delta_t} \left| \sum_l \sum_m U(l\Delta_{x0}, m\Delta_{y0}) rect_1 \left[ \frac{k\Delta_f v_f - l\Delta_{x0}}{\Delta_{x0}} \right] rect_1 \left[ \frac{v_s t' - m\Delta_{y0}}{\Delta_{y0}} \right] \right.$$

$$\left. \{g_1(x_0) * \delta(x_0 - k\Delta_f v_f)\} \{g_1(y_0) * \delta(y_0 - y_s t')\} \right|^2 dt'.$$

where I have used the fact that for $t \in |k(\Delta_f + \Delta_0), k(\Delta_f + \Delta_0) + \Delta_0|$, $$x_c \equiv \int_0^t v_{s0}(s)ds = k\Delta_{vf}.$$

Noting that $$rect_1\left(\frac{k\Delta_{vf} - l\Delta_{s0}}{\Delta_{s0}}\right) = \delta.$$

one has:

$$T_2(x_0,y_0) = \sum_{l=0}^{N-1} \int_0^{\Delta_t} \left|\sum_m U(l\Delta_{x0},m\Delta_{y0})rect_1\left(\frac{v_st' - m\Delta_{y0}}{\Delta_{y0}}\right)\right. \tag{29}$$

$$\left. \{g_1(x_0) * \delta(x_0 - l\Delta_{vf})\} \{g_1(y_0) * \delta(y_0 - v_st')\}\right|^2 dt'.$$

Expanding the square of the sum into a double sum one obtains:

$$T_2(x_0,y_0) = \sum_{l=0}^{N-1} \int_0^{\Delta_s} \sum_m \sum_s U(l\Delta_{x0},m\Delta_{y0})U^*(l\Delta_{x0}m,n\Delta_{y0})rect_1\left[\frac{v_st'' - m\Delta_{y0}}{\Delta_{y0}}\right] rect_1\left[\frac{v_st' - n\Delta_{y0}}{\Delta_{y0}}\right]$$

$$\{|g_1(x_0)|^2 * \delta(x_0 - l\Delta_{vf})\} \{|g_1(y_0)|^2 * \delta(y_0 - v_st')\}dt'.$$ But $$rect_1\left(\frac{v_st'' - m\Delta_{y0}}{\Delta_{y0}}\right) rect'\left(\frac{v_st' - n\Delta_{y0}}{\Delta_{y0}}\right) = rect'\left(\frac{v_st'' - m\Delta_{y0}}{\Delta_{y0}}\right)\delta_{ms}.$$ Therefore $$\tau_2(x_0,y_0) = \sum_l \sum_m |U(l\Delta_{x0}, m\Delta_{y0})|^2 \{|g_1(x_0)|^2 * \delta(x_0 - l\Delta_{vf})\}$$

$$\int_0^{\Delta_s} \{|g_1(y_0)|^2 * \delta(y_0 - v_st')\}rect_1\left[\frac{v_st' - m\Delta_{y0}}{\Delta_{y0}}\right] dt'.$$

The two-dimensional spatial Fourier transform of the self-interference term is (up to unimportant constants):

$$\dot{T}_2(u,v) = \dot{G}_1(u)\dot{G}_1(v) \sum_l \sum_m |U(l\Delta_{x0},m\Delta_{y0})|^2 e^{-i2\pi l\Delta_f v/s} \int_0^{\Delta_s} e^{-i2\pi v_s t'v} rect_1\left[\frac{v_st' - m\Delta_{y0}}{\Delta_{y0}}\right] dt' = \tag{23}$$

$$\dot{G}_1(u)\dot{G}_1(v)sinc(v\Delta_{y0}) \sum_l \sum_m |U(l\Delta_{x0},m\Delta_{y0})|^2 e^{-i2\pi[l\Delta_{y0}+m\Delta_{y0}v]},$$

where the fact has been used that $$\Delta_{y0} = \Delta_{vf} \text{ and } rect_1\left[\frac{t' - \frac{\Delta_s}{2}}{\Delta_s}\right] rect_1\left[\frac{v_st' - m\Delta_{y0}}{\Delta_{y0}}\right] = rect_1\left[\frac{v_st' - m\Delta_{y0}}{\Delta_{y0}}\right].$$

The term $\dot{G}_1(u)\dot{G}_1(v)$ is the autocorrelation of the Fourier transform of the scanning aperture, which was also present in the bias term. The $sinc(v\Delta_{y0})$ term is due to the low pass filtering action of the 0-order sample and hold circuit. (Recall that in the spatial domain its impulse response is $$rect_1\left[\frac{y_0}{\Delta_{y0}}\right] = rect_1\left[\frac{t'}{\Delta_f}\right])$$

The term, $$\sum_l \sum_m |U(l\Delta_{x0},m\Delta_{y0})|^2 e^{-i2\pi[l\Delta_{x0}s+m\Delta_{y0}v]},$$

is the Fourier transform of the component of the self-interference term arising from the sampled diffraction pattern itself. Because the FDP is sampled in the spatial domain, this term is a 2-D Fourier series expansion of a function periodic in u and v. The periodicities in the u and v directions are $$\frac{1}{\Delta_{s0}} \text{ and } \frac{1}{\Delta_{y0}}, \quad \text{respectively.}$$

respectively.

It is interesting that the centers of the cycles of the periodic function fall on the zeroes of the $sinc(v\Delta_{y0})$ function so that all but the first cycle of the periodic function are strongly attenuated in the v direction. Additionally, $\dot{G}_1(u)\dot{G}_1(v)$ will attenuate the cycles of the periodic function in both u and v. For example, in the case that $d_2(x_0,y_0)=\delta(x_0,y_0)$ one has $\dot{G}_1(u)\dot{G}_1(v)=|a|^2 sinc^2(au)sinc^2(av)$. Since $a \approx \Delta_{x0}$ the cycles of the periodic function will also be sharply attenuated in the u direction.

Thus, one sees that the recording of a hologram based upon discrete samples of the diffraction pattern leads to a replication of the self-interference term (and the real and conjugate images, as will be seen shortly) but the filtering associated with the scanning motion of the apertures has lead to terms in the spectrum of the self interference term which attenuate the replicas. This represents a benefit of using such a recorder.

The cross term: the real and conjugate image bearing terms

The main point of this entire analysis is to prove that the exposure pattern and consequently the hologram transmittance distribution contain the information necessary to reconstruct the real and virtual images which were used in their digital form to compute the encoded diffraction pattern. Once this is established, one can proceed to analyze the effects of the convolutions associated with the scanning upon these images. It is precisely the cross term which bears the image information.

Written out in full, the expression for the cross term is:

$$\tau_3(x_0,y_0) = \int_0^T 2Re\left\{ \sum_l \sum_m U^*(l\Delta_{x0},m\Delta_{y0})e^{|i2\pi\beta y0|} rect_2\left[\frac{x_e - l\Delta_{y0}}{\Delta_{s0}}\right] \cdot rect_1\left[\frac{y_e - m\Delta_{y0}}{\Delta_{s0}}\right] |A(x_0,y_0;t)|^2 \right\} b(t)dt, \quad (24)$$

where the facts have been used that $rect_1(\ )$ is real and $Re(3b)=aRe(b)$ if $a=a'$. One now partitions the integral into rows as in the previous analyses:

$$\tau_3(x_0,y_0) = 2Re\left\{ \sum_l \{|g_1(x_0)|^2 * \delta(x_0 - l\Delta_l v_l)\} \sum_m U^*(l\Delta_{x0},m\Delta_{y0})e^{|i2\pi\beta y0|} I_m(y_0) \right\} \quad (25)$$

where I have defined $I_m(y_0)$ by:

$$I_m(y_0) \triangleq \int_0^T rect_1\left[\frac{v_s t' - m\Delta_{y0}}{\Delta_{y0}}\right] \{|g_1(y_0)|^2 * \delta(y_0 - v_s t')\} dt'.$$

Rearranging the summations and bringing the real factors outside of the $Re(\ )$ operator one gets:

$$\tau_3(x_0,y_0) = 2 \sum_l \sum_m |U(l\Delta_{x0},m\Delta_{y0})|\cos(2\pi\beta y_0 - \angle LU(l\Delta_{x0},m\Delta_{y0}))H_l(x_0)I_m(y_0), \quad (26)$$

where: $H_l(x_0) \triangleq |g_1(x_0)|^2 * \delta(x_0 - l\Delta_l v_l)$. In order to analyze this expression futher one must consider the interpolating functions $H_l(x_0)$ and $I_m(y_0)$ which act separately in the $x_0$ and $y_0$ directions.

The interpolation functions $H_l(x_0)$ models the $x_0$ dependence of the squared magnitude of the diffraction pattern of the scanning aperture in the film plane centered on the $l^{th}$ row or strip of the hologram. $I_m(y_0)$ represents $y_0$ dependence of the squared magnitude of the diffraction pattern in the film pane, centered on $y_0=m\Delta_{y0}$ and convoled with the rect function, associated with the scanning motion. In order to study these interpolation functions further one will need to make some assumption about the diffraction kernel $d_2(x_0,y_0)$. My approach will be to first assume that $d_2(x_0,y_0)=\delta(x_0,y_0)$ which implies that the diffraction pattern of each of the apertures is exactly the geometric projection of that aperture. Once one understands the effects of the interpolation functions under this simplifying assumption, one will then consider the more general case in which $$d_2(x_0,y_0) = e^{iv\frac{|x09+y0|}{\lambda x0}}.$$

This will allow the study of the effects of the spreading diffraction patterns and perhaps, any high frequency fluctuations in these patterns.

The product, $H_l(x_0)I_m(y_0)$, under the geometric projection assumption is:

$$H_l(x_0)I_m(y_0) = \left\{ rect_1\left[\frac{x_0 - l\Delta_{s0}}{\alpha}\right] \right\} \int_0^{\Delta_s} rect_1\left[\frac{v_s t' - m\Delta_{s0}}{\Delta_{y0}}\right] rect_1\left[\frac{y_0 - v_s t'}{\alpha}\right] dt'. \quad (27)$$

One sees that $H_l(x_0)$ determines the amount (or lack) of overlap of the rows of the hologram. $I_m(y_0)$ is a convolution of two rect functions;

$$rect_1\left[\frac{y_0/v_s}{\Delta_{y0}/v_s}\right]$$

corresponds to the O-order sample and hold circuit, and $$rect_1\left[\frac{y_0/v_s}{\alpha/v_s}\right]$$

is due to the scanning apertures.

In order to explore the implications of the functional form of the interpolation functions, three distinct cases will be considered. The first is the case in which $\alpha=\Delta_{s0}$. This corresponds with what may be called the ideal case. With a complete understanding of the interpolation functions and $\tau_3(x_0,y_0)$ in this case, one will then consider $H_l(x_0),I_m(y_0)$, and $\tau_3(x_0,y_0)$ when $\alpha<\Delta_{s0}$ and $a>\Delta_{s0}$.

Ideal case: Aperture dimension equal to FDP sample spacing

The ideal case is that in which $\Delta_{y0}=\alpha$. In this case the convolution of the two rectangle functions in the expression for $I_m(y_0)$ yields a triangle function, $$\Lambda\left[\frac{y_0}{\Delta_{y0}}\right] = rect_1\left[\frac{y_0}{\Delta_{y0}}\right] + rect_1\left[\frac{y_0}{\Delta_{y0}}\right] =$$

The full two-dimensional interpolation function, $H_l(x_0)I_m(y_0)$, is plotted in FIGS. 3-6 for this case. The effects of $H_l(x_0)$ and $I_m(y_0)$ are considered separately.

$H_l(x_0)$ is plotted in FIG. 7 for three adjacent values of l in this case. As this figure shows, the rows of the hologram are contiguous with neither overlap nor gaps between them. This corresponds to perfect 0-order interpolation of the FDP samples in the feed direction.

Figure 8:
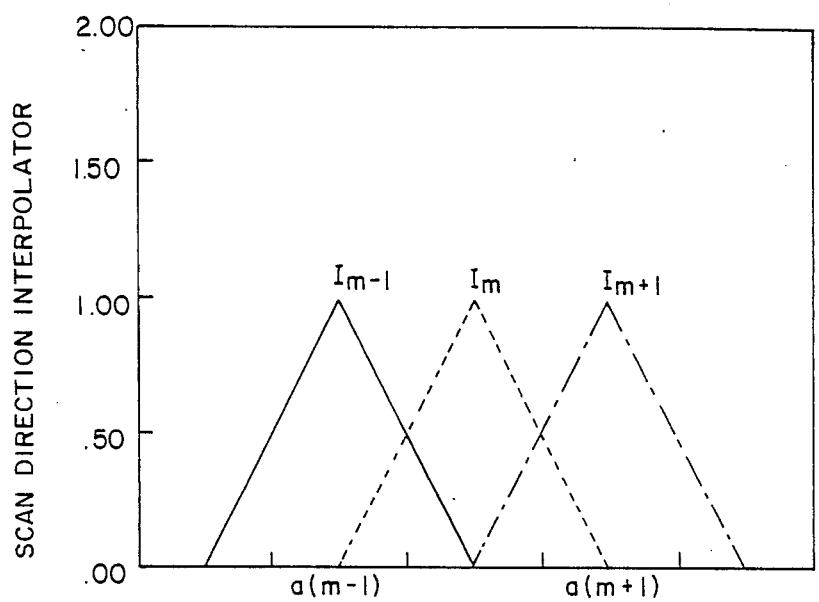
FIG. 8 is a plot illustrating scan direction interpolation.
Figure 9:
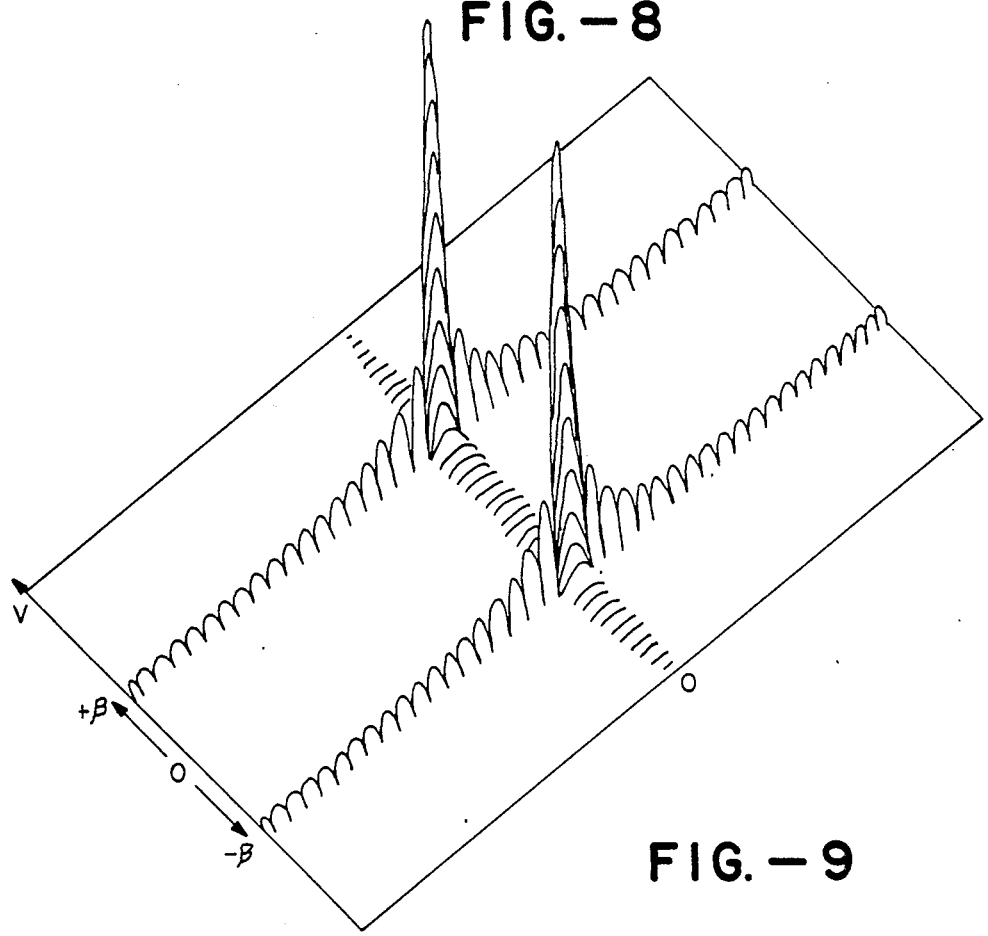
FIG. 9 is a plot of spectral envelope of image terms.

In the scan direction the situation is somewhat different. In FIG. 8 is plotted $I_m(y_0)$ for three adjacent values of m. It is clear, by the perfect overlap of the triangle functions, $t\Lambda(x)\Delta(1-|x|)$ if $|x|<1$ and 0 otherwise, that the in-phase and quadrature components of the FDP samples are linearly interpolated by the action of the triangle function. This may also be seen by expanding the $\cos(2\pi\beta y_0 - \angle U(l\Delta_{x0}, m\Delta_{y0}))$ term and substituting the triangle function for $x_m(y_0)$ in eq. (26):

$$\tau_3(x_0,y_0) = 2 \sum_l rect_1\left(\frac{x_0-l\Delta_{s0}}{\alpha}\right) \quad (28)$$

$$\sum_m \left\{ U_R(l\Delta_{x0},m\Delta_{y0})\Lambda\left(\frac{y_0}{\Delta_{y0}}\right)\cos(2\pi\beta y_0) + U_I(l\Delta_{x0},m\Delta_{y0})\Lambda\left(\frac{y_0}{\Delta_{y0}}\right)\sin(2\pi\beta y_0) \right\}.$$

where $U_R(l\Delta_{x0},m\Delta_{y0}) = Re(U(.,.))$ and $U_I(l\Delta_{x0},m\Delta_{y0}) = im(U(.,.))$. Notice that if $U_R(l\Delta_{x0},m\Delta_{y0}) \equiv 1$ and $U_I(l\Delta_{x0},m\Delta_{y0}) \equiv 0$ for all (l,m) then the cross term yields the high frequency spatial carrier $\cos(2\pi\beta y_0)$ without distortion, as expected.

I conclude from eq. (28) that the carrier is modulated by the interpolated values of the in-phase and quadrature components of the encoded diffraction pattern for all values of $(x_0,y_0)$ in the exposed area. Thus, the recorder geometry (FIG. 1) satisfies the objective of optically generating a high frequency carrier which is modulated by a digitally computed base-band diffraction pattern. The study of the ideal case will be completed by examining the spatial Fourier transform of the cross term.

After the straightforward application of the well known theorems related to Fourier transforms the spectrum of the cross terms under the ideal conditions is computed:

$$\tau_3(u,v) = \sum_l \sum_m |U(l\Delta_{x0},m\Delta_{y0})|\text{sinc}(\alpha u)e^{-|2\pi l\Delta x_0 u + m\Delta y_0 v|} \quad (29)$$

$$\{e^{-i\angle U(l\Delta_{x0},m\Delta_{y0})}\text{sinc}^2[\Delta_{y0}(v+\beta)] + e^{i\angle U(l\Delta_{x0},m\Delta_{y0})}\text{sinc}^2[\Delta_{y0}(v-\beta)]\}$$

The $\text{sinc}^2|\Delta_{y0}(v\pm\beta)|$ terms not only explicitly indicate the spectral separation of the real and conjugate image terms from the origin by the amount $\pm\beta$ but these terms, arising from the first order interpolation filter in the $y_o$ also show the suppression of the replicated spectral islands (in the v direction) which are due to the sampled nature of the FDP. In the u direction the replicated spectral islands are suppressed by the sinc($\alpha u$) function which arises from the window of the scanning aperture (recall that we are currently considering $\alpha=\Delta_{x0}$). A plot of the product of these sinc( ) functions is shown in FIGS. 3-9.

Non-Ideal case: Aperture larger than the FDP sample spacing

Now considered are effects of a scanning aperture which is wider than the distance between the computed sample points. From basic considerations of the convoluton of the rectangle functions, as expressed in eq. (3-18), one sees that the function $l_m(y_0)$ will be a difference of two $$l_m(y_0) = \Lambda\left(\frac{y_0 + m\Delta_{y0}}{(\alpha+\Delta_{t0})/2}\right) - \epsilon\Lambda\left(\frac{y_0 + m\Delta_{y0}}{(\alpha+\Delta_{t0})/2}\right) \quad \text{where} \quad (30)$$

$$\epsilon \triangleq \frac{\alpha}{v_s} - \frac{\Delta_{y0}}{v_s} = \frac{\alpha}{v_s} - \Delta_t$$

FIGS. 3-10 is a plot of the "flat-topped" triangle function. The resulting distortion may be most easily seen in the frequency domain. The Fourier transform of $I_0(y_0)$ is:

$$l_0(\nu) = \frac{\alpha+\Delta_{y0}}{2}\text{sinc}^2\left(\frac{\alpha+\Delta_{y0}}{2}\nu\right) - \quad (31)$$

$$\frac{\alpha-\Delta_{y0}}{2}\text{sinc}^2\left(\frac{\alpha-\Delta_{y0}}{2}\nu\right).$$

This equation indicates that the principle source of distortion is the suppression of the frequency components of the diffraction pattern in the region $$\nu\epsilon\left[\pm\frac{2}{\alpha+\Delta_{y0}}, \pm\frac{1}{\Delta_{y0}}\right].$$

The function of eq. (31) is plotted in FIG. 11. The frequencies between a rectangle function extending from $$-\frac{1}{\Delta_y} \text{ and } \frac{1}{\Delta_y}$$

and the cut-off frequency of the spectrum shown are suppressed and lead to a degradation (low-pass filtering) of the recorded diffraction pattern. The source of the frequency distortion is the narrowing of the larger (first) of the two sinc²( ) functions in the above expression. The corresponding spatial domain phenomenon is, of course, the widening of the base of the trapezoidal interpolation function. The base has widened, relative to the ideal case, because the aperture is wider than necessary. The point is that the filtering due to the scanning apertures now has a lower cutoff frequency. Thus, we see that it is wasteful to compute the samples of the diffraction pattern with higher spatial resolution than the width of the scanning apertures, as these higher frequencies will not be recorded.

Similarly, in the $x_0$ direction the interpolation will be smoother. The transform of $H_l(x_0)$ is proportional to $e^{-i2\pi l\Delta_{s0}}$ sinc($\alpha u$). As $\alpha$ increases the sinc( ) becomes narrower, causing a greater suppression of the higher frequencies contained in the FDP.

Non-Ideal case: Aperture smaller than the FDP sample spacing

In this case the recorder has higher resolution than the baseband diffraction pattern. The graph of the interpolation function, $I_m(y_0)$, looks similar to that of the previous case. The primary difference in that the base of the trapezoid is now narrower than in the ideal case. The corresponding spectrum is now broader and the spectral distortion decreases. The price paid for this decrease is distortion is that the apertures pass a lower fraction of the incident light energy so that the system's laser sources will have to be less attenuated (or made more intense). The primary advantage of this increase in resolution is that the system is capable of encoding higher frequency diffraction patterns.

In the $x_0$ direction an interesting phenomenon takes place. The sinc($\alpha u$) becomes wider, increasing the cut-off frequency of the low pass filter acting in this direction; but, the rows no longer overlap. This implies that there will be a strip of unexposed film between the rows of the film. In the case of a negative hologram the unexposed strips will be transparent. Thus, the illuminating light will simply pass through these regions undiffracted. This will result in both a weaker image and a stronger on-axis image of the light source. This is equivalent to a decrease in the efficiency of the hologram. In the case of a positive hologram the unexposed strips will be opaque. This is equivalent to placing a grating of frequency $$\frac{1}{\Delta_{s0}}$$

against the hologram. The grating can be represented by:

$$\sum_l rect_1\left[\frac{x_0](l+\delta)\Delta_{s0}}{\Delta_{s0} - \alpha}\right]$$

the $x_0$ dependence of the transmittance distribution of the hologram will be a product of this grating term and the $x_0$ dependence of the transmittance distribution described in eq. (28) for the ideal case. This grating will cause the images to be replicated at angles which are integral multiples of $$\pm \frac{\lambda}{\Delta_{s0}}$$

with respect to the $x_0$ axis, where $x_0$ is perpendicular to the $(x_0,y_0)$ plane. Accompanying this replication of the images is, again, a loss of efficiency. That is, approximately $$\left[\frac{\Delta_{s0} - \alpha}{\Delta_{s0}}\right]^2 \times 100\%$$

of the incident light energy will be undiffracted by this grating. This is the fraction of incident light energy which is available for image formation. It is interesting to note, however, that the Bragg condition will not be satisfied at the non-zero multiples of $$\pm \frac{\lambda}{\Delta_{s0}}.$$

So the light diffracted into these orders will be partially absorbed and/or transmitted by the reflection hologram and the replicated images will be highly attenuated.

The most important conclusion to be drawn from the above discussion is that the low pass filtering associated with the scanning apertures acts on the FDP samples and not the high frequency spatial carrier. A second conclusion to be drawn is that optimally, the scanning apertures will have the same width as the pixels representing the sampled FDP. If they are larger then the high frequencies of the FDP will be attenuated which will result in a roll off in intensity of the outer edges (and nearer points) of the reconstructed holographic image. If the apertures are smaller than the sample spacing then the efficiency of the hologram will decrease due to the unexposed gaps lying between the exposed rows of the film.

Attention is now turned to the analysis of the recorded pattern taking into account Fresnel diffraction of the apertures.

Diffraction effects: the diffracting apertures

Thus far it has been assumed that the diffraction due to the apertures is negligible. That is, $d_2(x_0,Y_0) = \delta(x_0,y_0)$. I shall now consider a case in which this is not true. In particular I shall study the case that $d_2(x_0, y_0) = e^{i\pi\alpha|x_{0s}+y_{0s}|}$, where $$\alpha = \frac{1}{\lambda z_0}.$$

In this case I have $$g_1(x_0) = rect_1\left(\frac{x_0}{\alpha}\right) * e^{i\pi\alpha x_{0s}}$$

One can jump to the evaluation of the interpolation functions $H_l(x_0)$ and $I_m(y_0)$.

$$H_l(x_0) = \left|rect_1\left(\frac{x_0 - l\Delta_{x_0}}{\alpha}\right) + e^{i\pi\alpha x_{0s}}\right|^2 \quad (32)$$

$$I_m(y_0) = \int_0^{\Delta_s} rect_1\left[\frac{v_s t' - m\Delta_{y_0}}{\Delta_{y_0}}\right] \quad (33)$$

$$\left\{\left|rect_1\left(\frac{y_0 - v_s t'}{\alpha}\right) + e^{i\pi\alpha x_{0s}}\right|^2\right\} dt'.$$

Deep within the Fresnel region it can be shown that the convolutions of eq. (32) and (33) yield geometric projections of the apertures themselves. There is a phase shift which is unimportant since only the magnitudes of these convolutions appear in the expressions. Even if the aperture edges do give rise to a high frequency variation in the diffraction pattern, due to the reflections from the edges of the apertures, it is seen that these variations will be removed by the filtering action of the scanning aperture. In the scan direction the filtering will be accomplished by the continuous convolution with $$rect_1\left(\frac{y_0}{\Delta_{y0}}\right),$$

due to the O-order hold circuit; i.e. each point of the film is exposed to the same FDP sample value for the time duration $$\Delta_t \triangleq \frac{\Delta_{y0}}{v_s}$$

as the aperture scans over it. In the feed direction there will not be blurring of the diffraction pattern unless there is overlap of the rows.

While the calculation of the Fresnel diffraction pattern can best be accomplished using a parallel processing system, calculations have been obtained using a Vax 11/780 computer equipped with a floating point accelerator and 4 MB of core memory. Attached hereto as Appendix A is the main program.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

APPENDIX A

```
/* Copyright March 1983.  Robert J. Perlmutter, Stanford University */
/*
 * Written by Robert Jon Perlmutter, ISL, Stanford University, Stanford Ca. USA
 */

/* Welcome to FRESNEL.C. This program is designed to input the specified
 * disk files (which are assumed to be in "plot2d" format, i.e. simple
 * two-dimensional images stored in a binary format, this format
 * is completely described in the General Purpose Plotting Package
 * available at the Office of Technology Licensing at Stanford University)
 * It will FRESNEL TRANSFORM these input image arrays using the parameters
 * specified by the user upon initialization. The generally complex arrays
 * must be input inline with the program call e.g. \140frenl IMAG REAL'
 * and the program will then request the necessary transform parameters.
 * The results will be processed as the user requested e.g. saved on mag.
 * tape as a digital hologram calculated by Lee's delayed sampling method
 * and the program will then return the user to the shell. Note that
 * use of mag. tape requires the user's presence.
 */

/* CALLING SEQUENCE:
 *
 *   frenl [IMAGE.imag] IMAGE.real [< parameter file ] [ > messages file ]
 *
 * WHERE:
 *
 * IMAGE.imag is the imaginary part of the first complex image and is optional
 *
 * IMAGE.real is the real part of the first complex image.  If it is the
 *            only argument given it is assumed to be real.
 *
 * NOTE: BOTH ARRAYS MUST BE SINGLE PRECISION FLOATING POINT NUMBERS
 *       WITH A POWER OF 2 ENTRIES PER ROW AND THEY MUST BE SQUARE!!
 *
 *   ++ THESE ARRAYS MUST ALSO BE IN PLOT2D FORMAT (SEE THE MANUAL).
 *
 *       You will be prompted at the standard input/output for the
 *       appropriate parameters and output file names.
 *
 * This allows one to Fresnel transform the Fresnel transorm etc.
 *
 */
/* THE FOLLOWING ORIENTATION CONVENTION IS USED THROUGHOUT THESE
 * PROGRAMS:
 *
 * HORIZONTAL COORD - X - J - <NPPR - COLNO.
 * VERTICAL   COORD - Y - I - <NPPC - ROWNO.
 */ include "/user/rjp/MACROFILE" /* this has macro definitions */
include <vadvise.h>    /* a standard 4.1BSD Unix system library */

/***** THE MAIN PROGRAM ******/
```

```c
/* The folowing main program is a short program designed to allocate
   memory in the VAX for the image arrays.
*/ char *valloc();  /* change to malloc for 4.2BSD */ main(argc,argv)
int argc;
char *argv[];    /* the name of the files containing the images */
{
        /*** DECLARE VARIABLES AND WARP MATRICES ***/ float *rfren, *ifren;           /* used to designate arrays in FRESNEL */
        double lambda, depth, xinc, yinc; /* wave#, prop dist., sampl parms */
        double uinc, vinc;
        int ncols,ncnt;                 /* # of rows/cols in the square matrices */
        int sign,xpatch,ypatch,extract,xmin,ymin,xmax,ymax;
        char fname[30];
        char fntoo[30];        /* file names for plotit files. */
        char TITLE1[100];
        char TITLE2[100];
        char TITLE3[100];      /* for input of the files */
        double graphit;        /* 1 -> graph the output */
        double magphase;       /* 1 => plot the magnitude and phase */
        int im_cent;           /* 1 => center of data at 0,0// 0-> n/2,n/2*/

/*** LABELS AND PARAMETERS FOR HOLOGRAM FORMATION ***/ int MLee = 0;          /* 1 -> produce fresnel hologram using
                                  a modified Lee's method p.55 ref.  1 */ int magtape = 0;       /* 1 -> write directly to mag. tape
                                  0 -> write directly to disk (plot2d form) */ int bigray = 0;        /* 0 -> gray level hologram,
                                  1 -> binary hologram
                                  2 -> both will be produced */ int burch = 0;         /* 1 -> produce a Burch type hologram */ double beta;           /* The burch holo params. */ int first = 1;         /* for the call no. to the burch sub.*/

/*** EXTERNAL SUBROUTINES ***/ extern subfres();

/*** ALLOCATE MEMORY FOR THE COMPUTATIONS ***/ rfren = (float *)valloc(4*MAXSIZE*MAXSIZE);    /* allocate memory */
        ifren = (float *)valloc(4*MAXSIZE*MAXSIZE);

if (rfren == NULL || ifren == NULL) {
                printf("Can\'t allocate enough memory.\n");
                exit(1);
        }

/***** INPUT THE PARAMETERS *****/

/*
 * Verify that at least one file was input
 */
        if (--argc > 0 ) {
           printf("verifying real file name: %s\n",argv[argc]);
        }
        else {
                printf("specify input image file(s) (imag.,real) in line.\n");
                exit(0);
        }
/*
 * Determine what to do with the output
```

```c
                accn(Should I plot the results on the lp. (1 = yes)?,graphit);

if(graphit == 1.0) {
                        accs(You should use plot2d for this.\n, fname);
                        accs(Enter the output FILE NAME(real or mag.), fname);
                        accs(Input GRAPH TITLE for real (mag.) plot,TITLE1);
                        accs(Enter the output FILE NAME(imag. or phase), fntoo);
                        accs(Input GRAPH TITLE for imag. (phase) plot,TITLE2);
                        accn(mag. and phase (1): mag*mag (2): none (0),magphase);
/*
 * To verify that the values were entered correctly:
 */
                        printf("fname = %s\nfntoo = %s\n", fname, fntoo);
                        printf("TITLE1 = %s\nTITLE2 = %s\n", TITLE1, TITLE2);
                        }

/*
 * If the output is a hologram what method should be used
 * to produce it and where should it be stored (disk or tape)?
 */ else    {
                acci(Should I produce a hologram by a mod. of Lee\'s method?,MLee);
                }
        if(MLee == 1) {
                accs(You may produce a magtape or a disk file as you choose.\n,TITLE1)
                acci(Output to magtape (1) or disk (0) ?, magtape);

if(magtape == 1) {
                        acci(Should I produce a gray level (0): binary (1) or both (2)
                        accs(Don\'t forget to be here for magtape responses,fname);

if(bigray != 2) {
                            accs(Enter a title for the hologram:,TITLE1);
                            }
                        else {
                            accs(Enter a title for the gray level hologram:,
                                    TITLE1);
                            accs(Enter a title for the binary level hologram:,
                                    TITLE2);
                            }

}
                else    {
                        accs(Enter the output file name:,fname);
                        accs(Enter a title for the hologram:,TITLE1);
                        }
                }
/*
 * Produce a Burch type hologram?
 */
        if((graphit == 0) && (MLee ==0)) {
                acci(Should I compute a Burch hologram?,burch);
                if(burch == 0) { printf("You can\'t be helped. So long!!!\n");
                                exit(1);
                }
                accs(,fname);
                accs(Enter the output file name:,fname);
                accs(Enter a title for the hologram:,TITLE1);

accn(Enter the carrier freq. in lp/mm. :, beta);
                }
/*
 * Now Enter parameters for the Fresnel Transform itself
 */

PARMS:. accn(wavelength of the laser light (um.) =?,lambda);
        accn(propagation distance (in 20,000\'s of wavelengths; + fwd: - inv. xform) =
/*
 * Inform the user of the actual prop. distance.
 */
        printf ("\nThe propagation distance is %f meters.\n", lambda*0.02*depth );
/*
```

```
* Note that u*x/(lambda*depth) = 1/MAXSIZE for accurate transform
*/
        accnd(width of xform sampling interval (u direction,mm.) =?,uinc);
        accnd(width of xform sampling interval (v direction,mm.) =?,vinc);

if ( depth < 0 ) { sign = -1; }
        else { sign = 1; } xinc = sign*lambda*0.02*lambda*depth/(MAXSIZE*uinc);
        yinc = sign*lambda*0.02*lambda*depth/(MAXSIZE*vinc);

printf("(xinc,yinc) = (%f,%f)mm.\n",xinc,yinc);

/*
* The user may specify one of two data origins
*/
        acci(If data origin is (0:0) type 1; if origin is (N/2:N/2) type 0.,im_cent);

if(im_cent == 1) { acci(Enter the integer extent of the image (e.g. 128),ncols);
           acci(Enter the horizontal patch coordinate:,xpatch);
           acci(Enter the vertical patch coordinate:,ypatch);
           acci(Do you want to save the patch only (1) or all (0)?,extract);
           if(extract == 1) {
                acci(Enter xmin:,xmin);
                acci(Enter ymin:,ymin);
                acci(Enter xmax:,xmax);
                acci(Enter ymax:,ymax);
           }
        }

/*** CONVERT INPUT PARAMETERS TO COMPATIBLE UNITS ***/ printf("x,y,u,v = %f,%f,%f,%f\n",xinc,yinc,uinc,vinc);
        printf("xmin,xmax,ymin,ymax = %d,%d,%d,%d\n",xmin,xmax,ymin,ymax);
        printf("extract,xpatch,ypatch,ncols = %d,%d,%d,%d\n",extract,xpatch,ypatch,nco printf("beta = %f\n",beta);

/*------------------------*****--------------------------------------*/

/***** NOW INPUT THE IMAGE MATRIX(ces) *****/

/*------------------------*****--------------------------------------*/

/*
* advise the memory manager of a large image processing program
*/
        vadvise(VA_SEQL);        /* remove for 4.2BSD */
        readit(argv[argc],TITLE3,rfren,MAXSIZE,MAXSIZE);

printf("I read the image\n");

/*
* Input the imaginary part of the image if it was given
*/
        if(--argc > 0) readit(argv[argc],TITLE3,ifren,MAXSIZE,MAXSIZE);
        else   {
                printf("Verifying: You entered a real image!\n");
                loop2(i,j,MAXSIZE)                /* initialize the array */
                    *(ifren+i*MAXSIZE + j) = 0.0;
        }
/*
* Compute the fresnel transform of the complex field given
* NOTE: Up till now the program has simply input the original
*       image and the parameters necessary to compute a Fresnel
*       diffraction pattern in the manner described in chapter 2
*       of the Ph.D. dissertation "Contributions to Digital Holography
*       for the Three-Dimensional Display of Medical Imagery" by
*       R.J. Perlmutter (dept. of E.E. at Stanford U., 1983)
*       The following subroutine does the actual computation.
```

```
                subfres(rfren,ifren,ncols,lambda,depth,
                        xinc,yinc,uinc,vinc,im_cent,xpatch,ypatch);

/*** produce a hologram by a Modified Lee method? ***/ if(MLee == 1)
                        modlee(rfren,ifren,MAXSIZE,fname,TITLE1,TITLE2,magtape,bigray);

/***** plot the results? *****/
        /*
         * Plot either mag. and phase or real and imag. parts as specced by the user
         */
                if(graphit == 1) { if(magphase == 1) magphas(rfren,ifren,MAXSIZE);
                        if(magphase == 2) magsqr(rfren,ifren,MAXSIZE);
                        plotit(fname,TITLE1,rfren,MAXSIZE,MAXSIZE);
                        plotit(fntoo,TITLE2,ifren,MAXSIZE,MAXSIZE);
                }

/*
         * Should we produce a Burch type hologram?
         */
                if(burch == 1) {
                        printf("about to compute the burch values\n");
                        ncnt = (MAXSIZE-ncols)*ypatch + ncols ;
                        subrch(rfren,ifren,vinc,beta,MAXSIZE,ncnt,first);
                        if(extract == 0)plotit(fname,TITLE1,rfren,MAXSIZE,MAXSIZE);
                        if(extract == 1)plotex(fname,TITLE1,rfren,MAXSIZE,MAXSIZE,xmin,ymin,xm
                } exit(0);

/*-------------------------------*****--------------------------------------------*/

}
/* Copyright March 1983.  Robert J. Perlmutter, Stanford University */
/*
 * Written by Robert Jon Perlmutter, ISL, Stanford University, Stanford Ca. USA
 */
        double trigx[MAXSIZE][2], trigy[MAXSIZE][2];    /* the complx wts */
        double xparms[2][5], yparms[2][5];              /* recurs. parms */
        double alpha,k1x,k1y,siarg,coarg;
        int conj;                       /* want the conjugate? */
        int fft = 0;                    /* assume forward transform */
        float rtmp,itmp;                /* holds the the intermediate vals */
        register int i,j;
        int ptsz = MAXSIZE - ncols;

/*** CONVERT INPUT PARAMETERS TO COMPATIBLE UNITS ***/ conj = ( depth > -1*depth) ? 1.0 : -1.0;

depth1 = depth*lambda*0.020;/* NOW depth1 IS THE ACTUAL PROP. DIST. */ alpha = 1/(depth1*lambda);      /* convert to inv. mm.s squared */ if (depth < 0) fft = 1;         /* neg. depth -> inverse xform */ xcnt=(im_cent == 0) ? MAXSIZE/2 : (uinc/xinc)*((ptsz*xcor)-(ncols));
        ycnt=(im_cent == 0) ? MAXSIZE/2 : (vinc/yinc)*((ptsz*ycor)-(ncols));

k1x = alpha*(xinc*xinc);
        k1y = alpha*(yinc*yinc);

/*
 * recur recursively computes the cos() and sin() functions
 * needed for the Fresnel transform
 */
        for(i=0;i<MAXSIZE;i++) {        /* load trig[] with the phase fctrs */
                recur(i,xcnt,k1x,*(trigx+i),xparms);
                recur(i,ycnt,k1y,*(trigy+i),yparms);
```

```
        }

/*** PHASE WARP THE IMAGES ***/ loop2(i,j,MAXSIZE) {          /* phase warp the input image */ coarg = (trigx[j][1] * trigy[i][1]) - (trigx[j][0] * trigy[i][0]);
            siarg = (trigx[j][0] * trigy[i][1]) + (trigx[j][1] * trigy[i][0]);

rtmp = coarg**(rfren+COORD(i,j)) - siarg**(ifren+COORD(i,j));
            itmp = siarg**(rfren+COORD(i,j)) + coarg**(ifren+COORD(i,j));

*(rfren+COORD(i,j)) = rtmp;        /* real part */
            *(ifren+COORD(i,j)) = itmp;        /* imag. part */

}                                      /* iwarp and rwarp are ready */
/*---------------------------*****---------------------------------------*/

/*** RFREN CONTAINS THE IMAGE; FRESNEL XFORM IT. ***/ timer1("Calling fftrow from subfres");

/*
 * fftrow simply Fourier transforms the rows of a complex pair
 * of matrices.  It uses fft842 as provided by the I.E.E.E.
 * in its digital signal processing library.
 */
        fftrow(rfren,ifren,fft,MAXSIZE,im_cent);    /* transform the rows */
        fftrow(rfren,ifren,fft,MAXSIZE,im_cent);    /* and now the columns */
/* Copyright March 1983.  Robert J. Perlmutter, Stanford University */
/*
 * Written by Robert Jon Perlmutter, ISL, Stanford University, Stanford Ca. USA
 */
/*
 * This subroutine is designed to compute the
 * (inverse or forward) Fresnel transform of a complex image.
 */
/* CALLING SEQUENCE:
 *
 * subfres(rfren,ifren,ncols,lambda,depth,xinc,yinc,uinc,vinc,im_cent,xcor,ycor)
 *
 * WHERE:
 *
 *   rfren and ifren are the single precision floating point square images
 *
 *   ncols = the number of columns(rows) of the NONZERO images: a POWER OF 2
 *           i.e. THE ncolsxncols IMAGE IS IMBEDDED IN THE MAXSIZEXMAXSIZE
 *                MATRIX. !!!!
 *
 *   lambda = the wave length in micrometers
 *
 *   depth = propagation distance in 20,000's of wavelengths
 *
 *   NOTE: The actual propagation distance is depth*20,000*lambda
 *
 *   if depth pos. value --> compute forward fresnel transform
 *
 *       else  neg. value --> compute inverse fresnel transform
 *
 *   xinc, yinc are the x and y sampling intervals in millimeters.
 *
 *   uinc, vinc are the u and v sampling intervals in mm. in the holo. plane
 *
 *   im_cent = 0 --> center of image data is at (Ncols/2,Ncols/2)
 *           = 1 --> center of image data is at (0,0)
 *
 *   (xcor,ycor) are the integer coordinates of the lower left corner of the
 *               patch which will be valid after these computations.
 *               Specify these coords in integer form referenced to (0,0)
 *               (See Perlmutter's dissertation for complete details)
 *
 */
```

```c
#include <math.h>
#include "/user/rjp/MACROFILE"
#define COORD(1,m) (1)*MAXSIZE + m

/*** THE MAIN PROGRAM ****/ subfres(rfren,ifren,ncols,lambda,depth,xinc,yinc,uinc,vinc,im_cent,xcor,ycor)

float *rfren;
float *ifren;
double lambda,depth,xinc,yinc,uinc,vinc;
int ncols,im_cent,xcor,ycor;
{

/*** DECLARE VARIABLES AND WARP MATRICES ***/ double xcnt,ycnt;           /* (xcnt,ycnt) is the origin of z.p. */
        double depth1;
        timer1("returned from fftrow:\n");

/*** PHASE WARP ONCE MORE TO YIELD FRESNEL PATTERNS ***/ k1x = alpha*(uinc*uinc);                    /* set up the warp factors */
        k1y = alpha*(vinc*vinc);

if(im_cent == 0) { xcor = 1; ycor = 1; }
        xcnt = ncols - (ptsz) * ( xcor );
        ycnt = ncols - (ptsz) * ( ycor );

for(i=0;i<MAXSIZE;i++) {
                recur(i,xcnt,k1x,*(trigx+i),xparms);
                recur(i,ycnt,k1y,*(trigy+i),yparms);
        } loop2(i,j,MAXSIZE) {        /* phase warp the output image */ coarg = (trigx[j][1] * trigy[i][1]) - (trigx[j][0] * trigy[i][0]);
            siarg = (trigx[j][0] * trigy[i][1]) + (trigx[j][1] * trigy[i][0]);

rtmp = coarg**(rfren+COORD(i,j)) - siarg**(ifren+COORD(i,j));
            itmp = siarg**(rfren+COORD(i,j)) + coarg**(ifren+COORD(i,j));

*(rfren+COORD(i,j)) = rtmp;              /* real part */
            *(ifren+COORD(i,j)) = itmp;              /* imag. part */

}                           /* iwarp and rwarp are ready */ printf("computing lin. phase factor\n");

/*
 * Compute the linear phase factors { -j } and exp { -j pi alpha gamma**2
 * xcnt*xcnt + ycnt*ycnt }
 * Note: it is assumed that depth is a whole # of wavelengths
 */
        k1x = uinc * uinc * xcnt * xcnt;
        k1y = vinc * vinc * ycnt * ycnt;
        alpha *= -1 * PI * ( k1y + k1x );

coarg = cos(alpha);
        siarg = sin(alpha);

loop2(i,j,MAXSIZE) {                         /* the linear phase fac*/
                rtmp = *(rfren+COORD(i,j))*siarg + *(ifren+COORD(i,j))*coarg;
                itmp = -1**(rfren+COORD(i,j))*coarg + *(ifren+COORD(i,j))*siarg;
                *(rfren+COORD(i,j)) = rtmp*conj;
                *(ifren+COORD(i,j)) = itmp*conj;
        } printf("exiting from subfres routine successfully!\n");

return;

}
/*---------------------------*****---------------------------------*/
```

```c
/*
 * This subroutine is designed to print system statistics
 */ timer1(s)
char *s;
{
        long timeb;
        char *ctime();
        char *p;
        time(&timeb);
        p=ctime(&timeb);
        *(p+24) = '\0';
        printf("%s:  %s\n",p,s);
}
/*------------------------------*****---------------------------------------*/
/* Copyright March 1983.  Robert J. Perlmutter, Stanford University */
/*
 * Written by Robert Jon Perlmutter, ISL, Stanford University, Stanford Ca. USA
 */
/*
 * Written by Robert J. Perlmutter, I.S.L. Stanford U. 1983
 * This subroutine recursively computes the sin() and cos() of
 * the double precision argument PI*K*(I-CNT)*(I-CNT)
 *
 * The first call to this routine should be with I = 0
 * so that the recursion parameters are initialized.
 *
 * The resulting cos() and sin() are in trig[1] and trig[0] resp.
 *
 * Each call requires 12 multiplies and
 * adds for the computation of both terms
 *
 */
/*
 * CALLING SEQUENCE:
 *
 *      1. declare 'double p[2][5]' to store the recursion parameters
 *      2. declare 'double trig[2]' to store the results i.e.
 *
 *              trig[0] = sin(PI*K*(I-CNT)*(I-CNT))
 *              trig[1] = cos(PI*K*(I-CNT)*(I-CNT))
 *
 *      3. YOU MUST CALL RECUR W/ I=0 FIRST TO INITIALIZE THE PARAMETERS
 *      4. YOU MUST CALL RECUR IN ASCENDING ORDER I.E. I=0,1,2,...
 *
 *      5. 'recur(i,cnt,k,trig,p)'
 *
 *      where:  i = index no. i.e. 0,1,2,...
 *              cnt = center coord., a pos. or neg. double prec. flt. pt #
 *              k = constant e.g. alpha*gamma*2
 *              trig = pointer to a double precis. flt. pt. buffer[2]
 *              p = pointer to a double precis. flt. pt. buffer[2][5]
 *
 *      returns:
 *              trig[0] = sin()         (see above)
 *              trig[1] = cos()
 *
 *      NOTES:  THE FOLLOWING RECURSION PARAMETERS ARE ALSO GIVEN BY RECUR
 *
 *              parms[0][0] = sin(k)            parms[1][0] = cos(k)
 *              parms[0][1] = sin(2ki)          parms[1][1] = cos(2ki)
 *              parms[0][2] = sin(ki**2)        parms[1][2] = cos(ki**2)
 *              parms[0][3] = sin(k*(2i-1))     parms[1][3] = cos(k*(2i-1))
 *              parms[0][4] = sin(2k)           parms[1][4] = cos(2k)
 *
 *      where: i = (I - CNT)
 */ include <stdio.h>
include <math.h>    /* The math library routines */
#define PI      3.14159265358979323846264338327950288    /* used for obvious reasons
```

```
recur(m,cnt,k,trig,parms)
int m;
double k,*trig,parms[][5],cnt;
{
        double sin();
        double cos();
        double s1tmp,s2tmp,k2;
        int k1;
        if(m == 0) {                      /* init. the recursion parameters */ k1 = 2*k;
                k2 = PI*(2*k - k1 + k1%2);    /* take the value mod 2pi */
                parms[0][4] = sin(k2);
                parms[1][4] = cos(k2);

k1 = k;
                k2 = PI*(k - k1 + k1%2);    /* take the value mod 2pi */
                parms[0][0] = sin(k2);
                parms[1][0] = cos(k2);

k1 = k*2*-1*cnt;
                k2 = PI*(k*2*-cnt - k1 + k1%2);    /* take the value mod 2pi */
                parms[0][1] = sin(k2);
                parms[1][1] = cos(k2);

k1 = k*cnt*cnt;
                k2 = PI*(k*cnt*cnt - k1 + k1%2); /* take the value mod 2pi */
                parms[0][2] = sin(k2);
                parms[1][2] = cos(k2);

k1 = k*(2*-cnt);
                k2 = PI*(k*2*-cnt - k1 + k1%2);   /* take the value mod 2pi */
                parms[0][3] = sin(k2);
                parms[1][3] = cos(k2);

trig[0] = parms[0][2];
                trig[1] = parms[1][2];

return;    /* return the initial value */
        } s1tmp = parms[0][1]*parms[1][4] + parms[1][1]*parms[0][4];    /* update the
        parms[1][1] = parms[1][1]*parms[1][4] - parms[0][1]*parms[0][4];
        parms[0][1] = s1tmp;

parms[0][3] = parms[1][0]*parms[0][1] - parms[0][0]*parms[1][1];
        parms[1][3] = parms[1][0]*parms[1][1] + parms[0][0]*parms[0][1];

s2tmp = parms[0][2]*parms[1][3] +parms[1][2]*parms[0][3];
        parms[1][2] = parms[1][2]*parms[1][3]-parms[0][2]*parms[0][3];
        parms[0][2] =s2tmp;

trig[0] = parms[0][2];
        trig[1] = parms[1][2];              /* return */
        return;
}
/*
 * This include file contains the macro definitions used
 * for inputting parameters in fresnel.c
 */
include <stdio.h>
#include <math.h>   /* The math library routines */

/****** Macros for prompting and inputting ******/

/* 1. accn = accept a floating point number *****/ define accn(s,k)    fprintf(stderr,"s ");scanf("%f",&k)
define accnd(s,k)   fprintf(stderr,"s ");scanf("%e",&k)
/* 2. accs = accept a string; note that k had better be a string name */

/*    PLEASE NOTE:  AFTER TWO SUCCESIVE USES OF THESE MACROS (ACCS/I/N)
 *                  ONE SHOULD USE SHOULD FLUSH THE BUFFER BY USING ACCS
```

```
 *       WITH A DUMMY VARIABLE. (E.G. THE VARIABLE WHICH WILL
 *       BE USED IN THE NEXT MACRO CALL)
 */ define accs(ring,filek)    fprintf(stderr,"ring\n");gets(filek)

/* 3. acci = accept an integer... */ define acci(s,int)    fprintf(stderr,"s ");scanf("%d",&int)

/*** CONSTANTS FOR DEFINING MATRICES AND WHATNOT ***/ define MAXLINE 512    /* max. # of input chars/line when reading file */
define MAXSIZE 512        /* max. # of columns in the square matrix */ define PI      3.141592653589793238462643383279502288
define PMODE   0644    /* WRITE PROTECTED, READ FREE */
int i,j;        /* looping indices in all programs */
#define loop2(i,j,width) for(i=0;i<width;i++)for(j=0;j<width;j++)
```

What is claimed is:

1. A method of recording a hologram in a recording medium comprising the steps of calculating samples of a two-dimensional complex field distribution for a diffraction pattern of a three-dimensional object based on a computer model of the object, providing a recording medium, providing a first reference coherent light source and providing a second object coherent light source through use of a laser-visible light source and optics to split light from said laser source into two beams, and expander and collimator means to expand and collimate the two light beams, modulating a light beam from said second object coherent light source in response to amplitude and phase values of said two-dimensinal complex field distribution samples, and scanning said recording medium with a reference light beam from said first reference coherent light source and with a modulated object beam from said second object coherent light source by providing opaque plates with apertures therein and moving said apertures, said light beams intersecting in said recording medium as said beams are scanned.

2. The method as defined by claim 1 wherein the frequencies of said first and second beams and the angle of inclination of said reference beam with respect to the surface of said recording medium are established by said calculated two dimensional complex field distribution.

3. The method as defined by claim 2 wherein said object light beam and said reference light beam are directed onto said film recording medium from opposite sides of said film recording medium.

4. The method as defined by claim 1 wherein said diffraction pattern is a Fresnel diffraction pattern.

5. Means for recording a hologram in a medium comprising means for calculating a two-dimensional complex field distribution for a diffraction pattern of an image based on a computer model of the object, means for providing a first reference coherent light source and means for providing a second object coherent light source comprising a visible light laser source, a beam splitter to obtain an object beam and a reference beam, and expander and collimator means for expanding and collimating the reference beam and the object beam, means for amplitude and phase modulating a light beam from said second object coherent light source in response to amplitude and phase values of said two-dimensional complex field distribution, and means for directing a reference light beam from said first reference coherent light source and a modulated light beam from said second object coherent light source onto a recording medium including first and second opaque plates with apertures therein, said light beams scanning said recording medium and intersecting in said recording medium.

6. Means as defined by claim 5 wherein said means for directing directs said reference light beam and said modulated light beam from opposite sides of said film recording medium.

7. Means as defined by claim 5 wherein said diffraction pattern is a Fresnel diffraction pattern.

8. Means as defined by claim 5 wherein said apertures are moved by electronically controlled electro-optic crystals.

* * * * *